United States Patent [19]

Gyugyi et al.

[11] Patent Number: 4,578,746

[45] Date of Patent: Mar. 25, 1986

[54] INTERLACED PULSE-WIDTH MODULATED UNRESTRICTED FREQUENCY CHANGER SYSTEM

[75] Inventors: Laszlo Gyugyi, Penn Hills; Theodore M. Heinrich, Murrysville, both of Pa.; Gyu-Hyeong Cho, Seoul, Rep. of Korea

[73] Assignee: Westinghouse Electric Corp., Pittsburgh, Pa.

[21] Appl. No.: 596,329

[22] Filed: Apr. 3, 1984

[51] Int. Cl.[4] ............................................. H02M 5/257
[52] U.S. Cl. .................................... 363/161; 318/810; 363/165
[58] Field of Search ..................... 318/808, 810, 811; 363/8, 10, 41, 44, 47, 160, 161, 162, 164, 165

[56] References Cited

U.S. PATENT DOCUMENTS

| | | | |
|---|---|---|---|
| 3,470,447 | 9/1969 | Gyugyi et al. | 363/10 |
| 3,493,838 | 2/1970 | Gyugyi et al. | 363/10 |
| 3,967,173 | 6/1976 | Stich | 363/41 |
| 4,047,083 | 9/1977 | Plunkett | 363/41 |
| 4,337,429 | 6/1982 | Stuart | 363/41 |
| 4,488,216 | 12/1984 | Gyugyi et al. | 363/160 |

OTHER PUBLICATIONS

Gyugyi et al., "Static Power Frequency Changers", pp. 5–14 and 363–383, John Wiley & Sons, 1976.

*Primary Examiner*—William H. Beha, Jr.
*Assistant Examiner*—Jeffrey Sterrett
*Attorney, Agent, or Firm*—C. M. Lorin

[57] ABSTRACT

In a static frequency changer controlled by adjusting the time of conduction of the bilateral switching units forming static converters, the time of conduction is split into n time intervals of respective subdurations adding up to be equivalent to the effective time of conduction of the controlled switching unit, and such subdurations are spread and distributed throughout the time period of control of the switching unit both within the original switching pattern of each converter and between the effective times of conduction of the respective converters, thereby to minimize harmonic distortion of the input supply current of the frequency changer.

5 Claims, 39 Drawing Figures

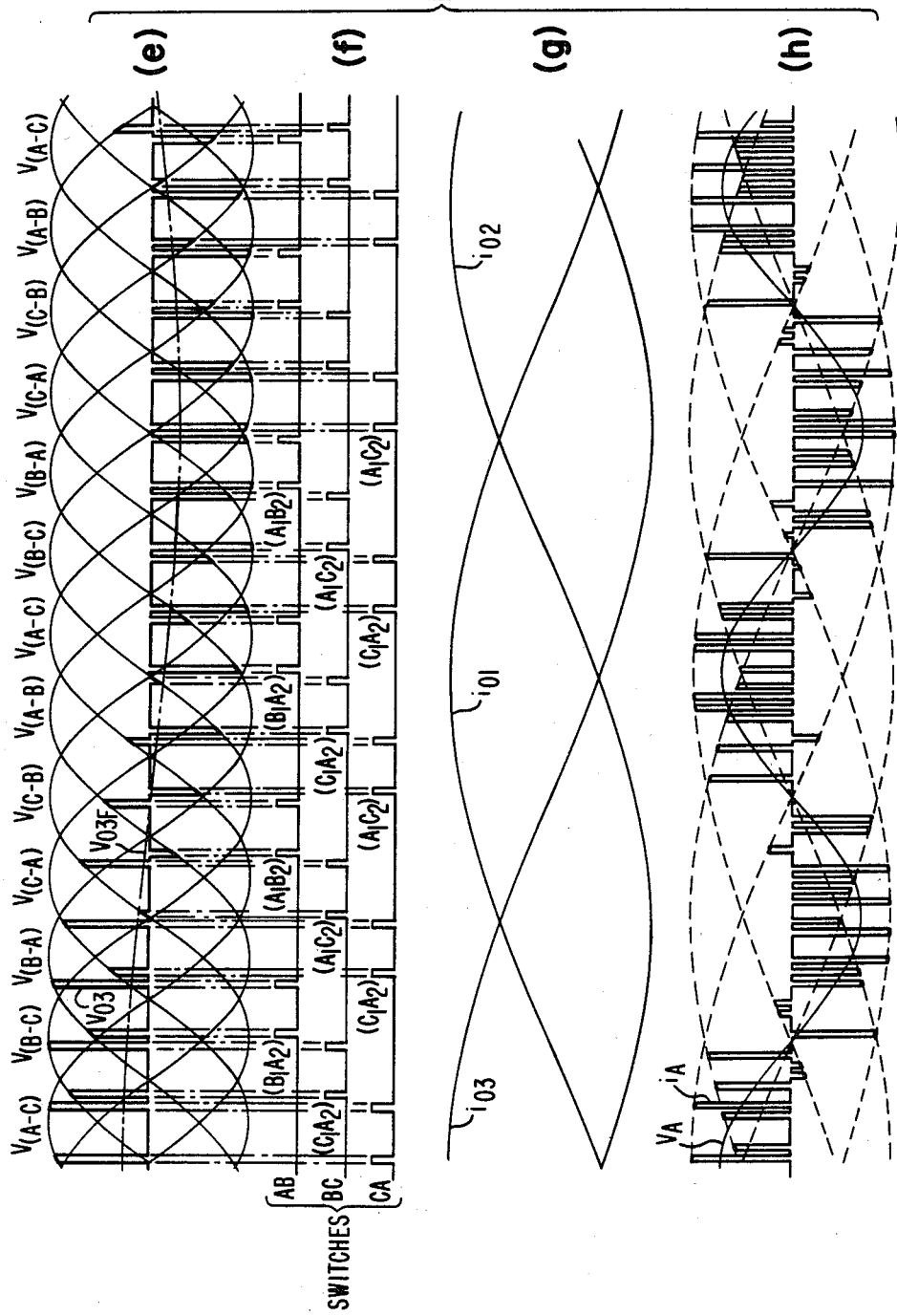

INTERLACED PULSE-WIDTH MODULATED UNRESTRICTED FREQUENCY CHANGER SYSTEM

BACKGROUND OF THE INVENTION

The invention relates to static power frequency changers in general, and more particularly to Unrestricted Frequency Changers (UFC) and their applications, for instance to adjustable speed AC motor drives.

The Unrestricted Frequency Changer (UFC) and its adjunct static switch control for the generation of an AC wave of controlled voltage and frequency have been described in U.S. Pat. No. 3,470,447 and U.S. Pat. No. 3,493,838 of L. Gyugyi et al. These patents show how the switches in each of the static converters associated with an output phase of the load can be selectively and cyclically controlled for conduction during a predetermined time interval so as to derive and output power defined by a controlled increment of the input voltage, itself delineated between two time intervals used for shorting the output, which process results in an AC output voltage having a frequency depending upon the repetition rate of the conduction time intervals and a magnitude measured by the time period of effective conduction of each static switch. Such an unrestricted frequency changer is advantageously applied in variable speed AC drives as explained on pages 5-14, and 363-383 of "Static Power Frequency Changers" by L. Gyugyi and B. R. Pelly, published by John Wiley & Sons, 1976. In this regard, for instance, Gyugyi and Pelly have observed that the UFC has an inherent bilateral characteristic between the power source at its input and the power supply at its output, which allows a four-quadrant operation of the motor drive without costly additional circuitry.

The unrestricted frequency changer technique has become particularly attractive with the advent of modern semiconductor switches, for instance, power transistors, and GTO devices.

UFC voltage control by pulse-width-modulation (PWM) is useful for wide range variable frequency drive of the motor. One disadvantage of the PWM UFC in a motor drive, is that it causes a large amount of extrabasal components in the input current. The extrabasal components can be reduced to a certain amount by inserting a proper input filter. This approach, however, has revealed that a somewhat large size filter is required. If the filter size is increased, filter VAR rating, that is, the reactive current, insertion loss are also increased, not to mention the cost. In order to reduce the filter size, one method is to increase the carrier frequency of the PWM UFC system from a single modulation to double, triple, quadruple modulations. As the modulation frequency increases, the frequencies of the extrabasal components which have the dominant amplitudes also shift to higher range and filtering becomes easier. However, in this case, switching loss will also increase and the upper limitation will be determined by the characteristics of the switches.

SUMMARY OF THE INVENTION

The present invention resides in controlling the bilateral switches of an Unrestricted Frequency Changer (UFC), each switch upon its turn, within the switching cycle of the output phase so as to "interlace" the active conduction intervals of the switches in the three power converters of the respective phases, whereby the conduction intervals for the three converters no longer coincide. This is achieved by dividing the active time interval of the prior art into at least two identical sub intervals which are displaced symmetrically with respect to the center of the time frame of control per phase and distributed equally across the three phases for the same time frame.

Such control of the bilateral switches is accomplished digitally.

The present invention is based on the observation that for a 6-pulse UFC system, isolations of three motor windings are required and each winding is driven independently by each 6-pulse UFC converter. In such case, there is no need to modulate symmetrically for all three converters of the UFC system. In other words, the converters can be modulated independently from one another and unsymmetrically. Reduction of input rms extrabasal current can, then, be achieved by using a proper modulation technique.

BRIEF DESCRIPTION OF THE DRAWINGS

FIGS. 9A-9C show sets of curves for three respective increased widths of the conduction intervals illustrating the input current wave shapes with the technique of FIG. 8B;

DETAILED DESCRIPTION OF THE INVENTION

Figure 1:
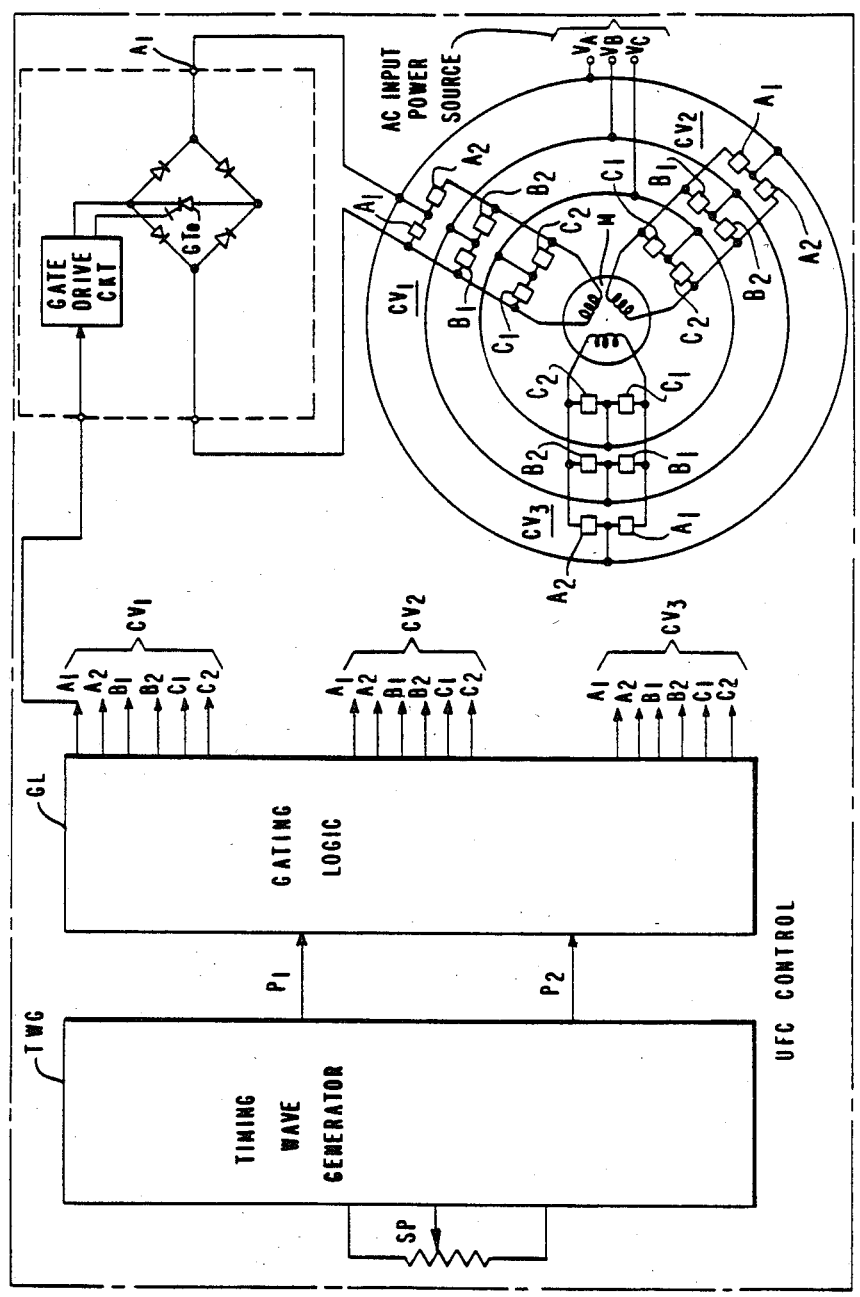
FIG. 1 is a block diagram of an UFC motor drive system according to aforementioned U.S. Pat. Nos. 3,470,447 and 3,493,838.

For the purpose of illustration the invention will be described as part of an AC drive system. It is understood, however, that the Unrestricted Frequency Changer (UFC) according to the invention can be used in a variety of industrial and other applications.

In the AC drive system of the preferred embodiment of the invention an Unrestricted Frequency Changer (UFC) is used to provide variable frequency-variable voltage output power to control the speed of an AC induction motor. In keeping with the volt-per-hertz characteristic of the induction motor, the fundamental output voltage is varied essentially in proportion with the output frequency. Such variation of the output voltage had been achieved up to now by simple pulse-width variation technique. This prior art approach resulted in increased motor current harmonics and the occurrence of increased ripple in the input supply current at relatively low motor speeds. A new voltage control method is now proposed which minimizes the input supply and motor current ripples over the total speed (output frequency) range. This results in significant improvement in motor performance at low speeds and economic benefits by reducing the input filtering requirements and motor losses.

The Unrestricted Frequency Changer (UFC) described in U.S. Pat. Nos. 3,470,447 and 3,493,838 as static "artificially" commutated frequency converters with variable output voltage is well known in the literature, and this prior art type of converter will be hereinafter designated as the UFC.

When compared to other static power converters, the UFC has significant advantages that make it particularly suitable for providing variable frequency electric power to control the speed of AC motors. These advantages can be listed as follows:

1. Single stage power conversion with bidirectional power flow (i.e., power can flow either to or from the load). This permits regenerative braking of the motor.
2. A wide output frequency range, which is not limited by the input (supply) frequency. That is, the generated output frequency can be lower, higher, and equal to the input frequency.
3. The frequency spectrum of the output waveform is independent of the amplitude of the wanted fundamental component. Furthermore, the frequencies of the "unwanted" (harmonic) components in the output waveform are widely separated from the fundamental frequency over the total output frequency range. This separation of the harmonic frequencies from the fundamental increases "naturally" (i.e., without changing the method of output voltage waveform construction) as the fundamental output frequency decreases. Thus the frequencies of the harmonic currents in the motor remain high relative to the fundamental, even at low speeds. Therefore the motor runs without cogging.
4. The output voltages of a three-phase converter are inherently in balance. Nevertheless, individual control of the three output voltages is possible.
5. The lagging (inductive) motor displacement power factor results in leading (capacitive) displacement power factor (with equal phase angle) at the AC supply. Therefore, unity output (load) displacement power factor is reflected back to the AC supply without change.
6. Control is simple, that is, the output frequency and voltage can be controlled as shown in the Gyugyi et al. patents by two appropriately displaced pulse trains, both having the same even rate.

However, the Unrestricted Frequency Changer has the disadvantage that with the prior art method of voltage control described in the above-mentioned U.S. Patents, the amplitudes of the harmonic components in the output voltage, and those in the input current drawn from the AC power supply, increase appreciably as the fundamental output voltage is decreased. This results in increased losses in the machine at low speeds, and it may necessitate considerable filtering in the input supply lines. A method is now proposed, according to the present invention, by which the amplitude of the fundamental output voltage is controlled while maintaining an essentially constant amplitude ratio between the dominant harmonics and the fundamental voltage and current at the output and input terminals of the UFC as the output voltage is varied from maximum to zero.

The Unrestricted Frequency Changer (UFC) motor drive system described in the aforementioned U.S. Patents, is illustrated schematically in FIG. 1. It consists of three identical bidirectional converter power circuits, $CV_1$, $CV_2$, $CV_3$, supplying the three stator windings $W_1$, $W_2$, $W_3$, of an induction motor M, a gating logic GL generating the electrical signals necessary to turn ON and OFF the bilateral switching units ($A_1$, $A_2$, $B_1$, $B_2$, $C_1$, $C_2$) in each of the converters $CV_1$, $CV_2$, $CV_3$. A timing wave generator TWG is provided outputting two pulse trains $P_1$, $P_2$ in response to external analog signals which determine through a setpoint SP the output frequency $f_0$ and voltage $V_0$ applied to the motor. The relationship between the two control pulse trains $P_1$, $P_2$ and the output voltage $V_0$ of the UFC is illustrated by the waveforms (a), (b), (c) shown in FIG. 2. As seen by (a), pulse train $P_1$ determines the output frequency and in accordance with (b) pulse train $P_2$ determines the amplitude $V_0$ of the fundamental output voltage. The two pulse trains are so coordinated that the output voltage $V_0$ increases with increasing output frequency $f_0$ so as to maintain an essentially constant air-gap flux in the motor. FIG. 1 illustrates gating by the gating logic circuit GL of the gate drive circuit of switching unit $A_1$ within converter $CV_1$, switching unit $A_1$ having a GTO device mounted for bilateral operation. Switching unit $A_1$ is illustrative of the other switching units $A_2$, $B_1$, $B_2$, $C_1$ and $C_2$.

Figure 2:
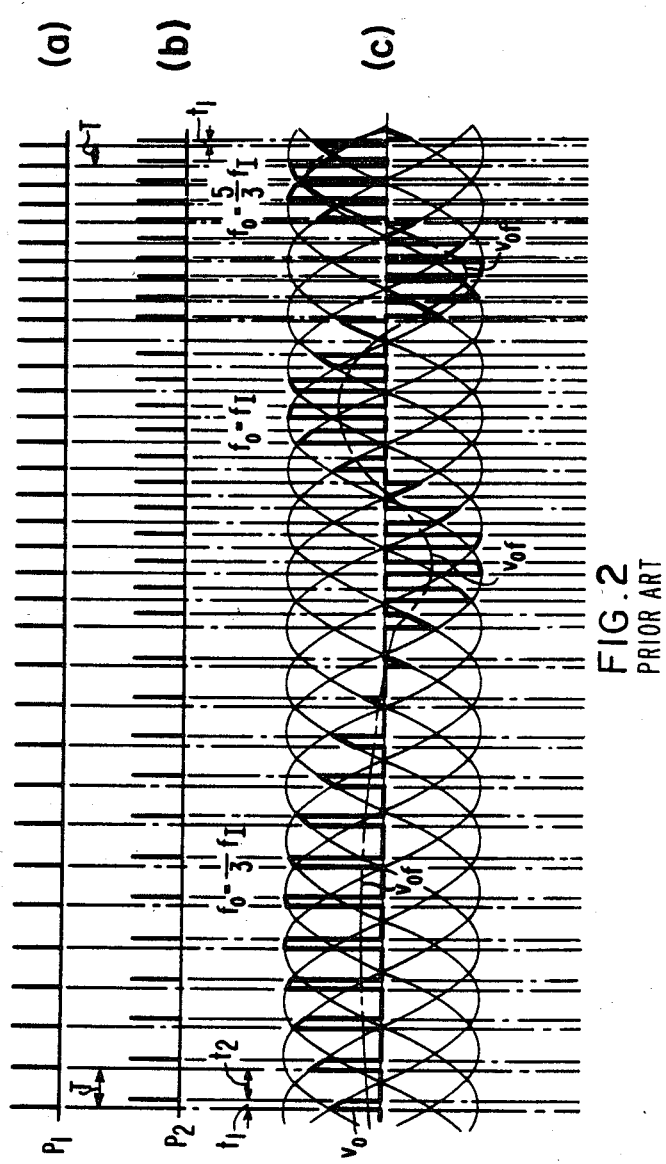
FIG. 2 is a chart illustrating with curves the effect of three different repetition rates and spacings of the control pulse trains P1, P2 of the system of FIG. 1 upon the output frequency and voltage and upon the output current.

It appears, from curve (c) of FIG. 2, that between two consecutive pulses $P_1$, $P_2$ a segment of one of the input voltage waves provided by the input AC power source is connected to the output of the converter by the gated bilateral switches ($A_1$, $A_2$, $B_1$, $B_2$, ... or $C_2$). Between two consecutive pulses $P_2$ and $P_1$, the output of the converter is shorted by the bilateral switches. Such successive "segments of voltage" are derived from the input and applied to the output according to a definite conduction pattern which involves six consecutive different bilateral switches such as $A_1$ shown in the example of FIG. 1. Such successive "segments of voltage" are building up an alternating output voltage $V_0$ with an essentially sinusoidal envelope, as shown, for different output frequencies $f_0 = \frac{1}{3}f_I$, $f_0 = f_I$ and $f_0 = 5/3f_I$, by curve (c) of FIG. 2. The average of the "voltage segments" caused by conduction of a bilateral switch ($A_1$, $A_2$, $B_1$ ... $C_2$) between two successive pulses $P_1$, $P_2$ (shown on FIG. 2 under (a) and (b), respectively) varies essentially sinusoidally over the output cycle as illustrated by the dotted line under (c) in FIG. 2. The motor current $i_0$ due to the converter output voltage $V_{0f}$ as shown in FIG. 2 under (c) is illustrated in FIG. 2 by curve (d). The dotted line there shows the fundamental component $i_{0f}$ of the motor current $i_0$.

The switching pattern depends upon the time interval between two consecutive pulses $P_1$, $P_2$ as well as upon the repetition rate of the two trains of pulses. In order to maintain a constant air-gap flux in the motor, when the frequency $f_0$ increases (increased repetition rate of $P_1$, $P_2$) the voltage $V_0$ is automatically increased by spacing more $P_1$ and $P_2$ from one another, thereby increasing the width of each "voltage segment". This is shown in FIG. 2 under (a), (b) and (c) for three instances of output frequency: $f_0 = \frac{1}{3}f_I$, $f_0 = f_I$ and $f_0 = 5/3f_I$, where $f_I$ is the frequency of the input AC power source supplying the three converters $CV_1$, $CV_2$, $CV_3$.

Figure 3A:
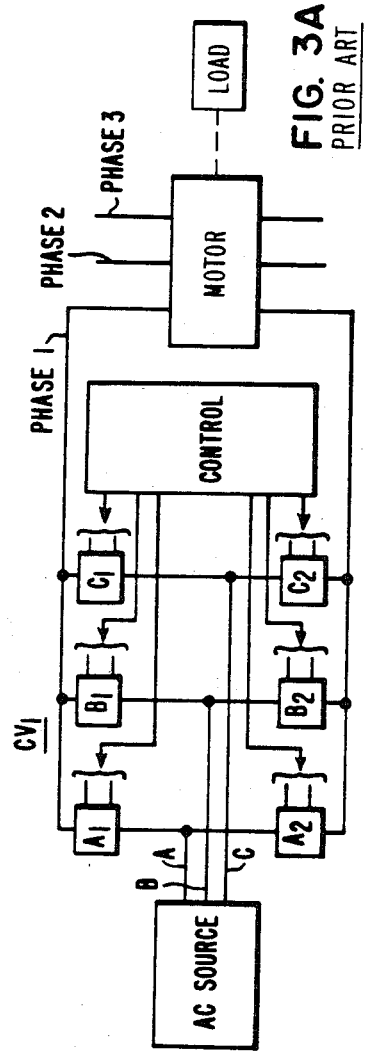
FIG. 3A shows the three phases of FIG. 1 associated with the load.

FIG. 3A shows the UFC connected with the three phases of the load.

Figure 3:
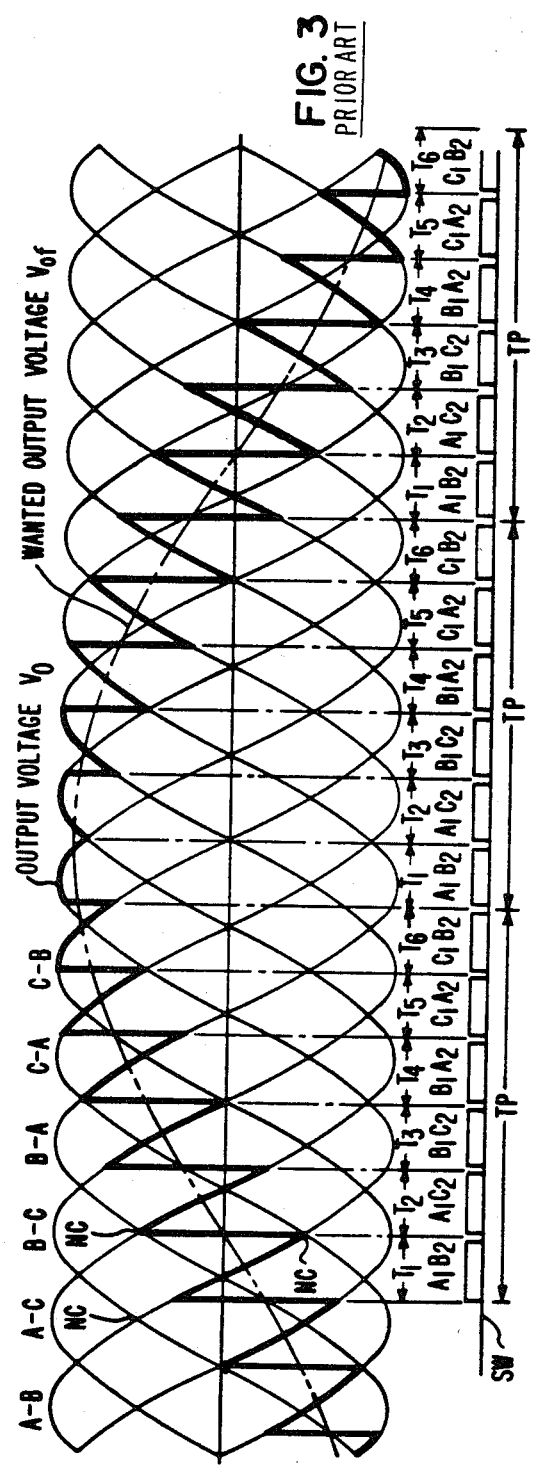
FIG. 3 shows with curves the operation of the system of FIG. 1 and FIG. 3A without exercising any control of the commutated switches of the converters for the purpose of adjusting the magnitude of the output voltage.
Figure 4:
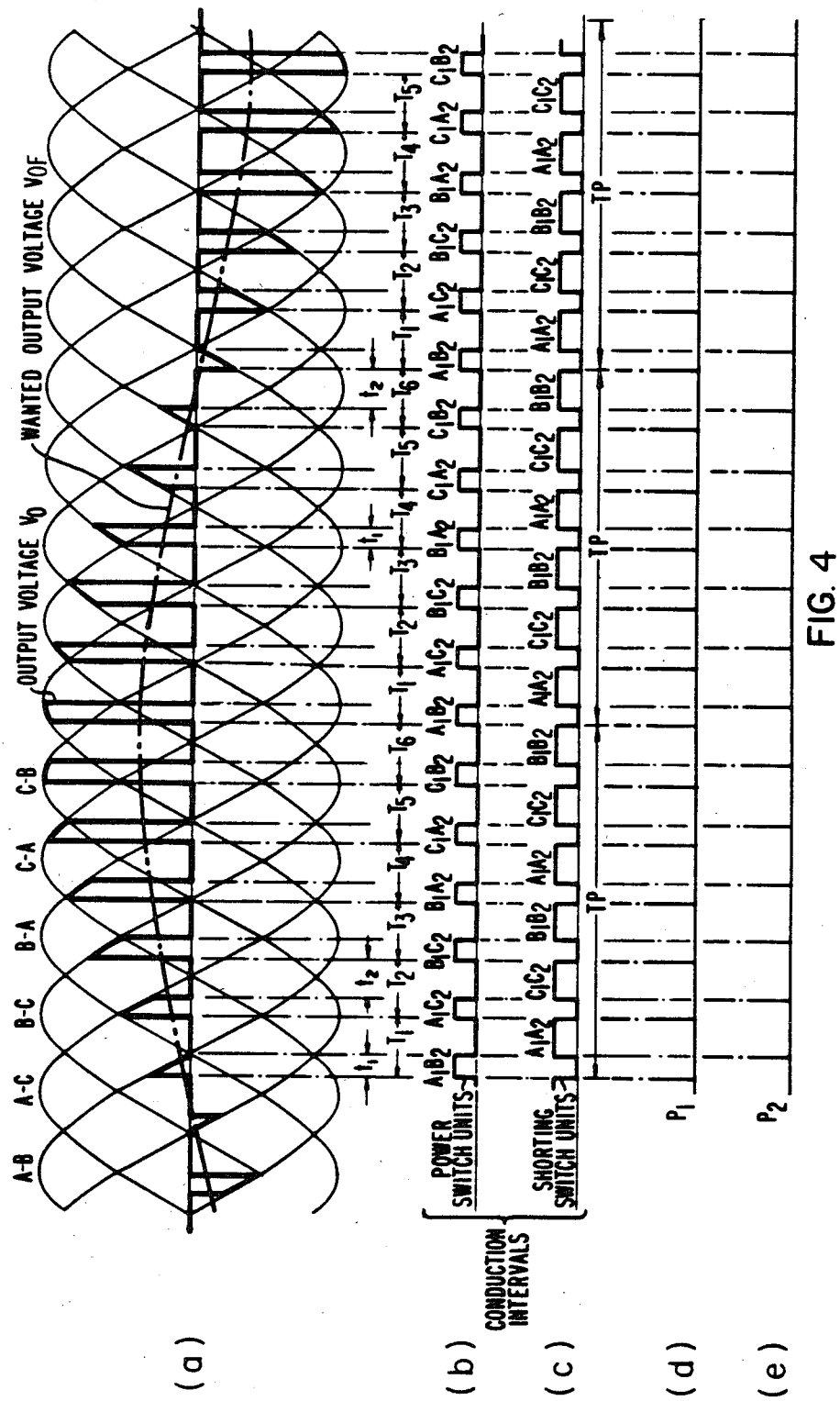
FIG. 4 shows with curves how the control pulse trains P1 and P2 of the system of FIG. 1 establish controlled periods of conduction delineated between controlled shorting periods to adjust the magnitude of the output voltage.

The basic operating principles of the UFC will be better understood by referring to the waveforms shown in FIGS. 3 and 4 for one of the three outputs of the UFC. The basic output voltage waveform $V_0$ of the UFC, ignoring for the moment the control of the magnitude of the fundamental component, can be generated by allowing the pairs of switching units $A_1B_2$, $A_1C_2$, $B_1C_2$, $B_1A_2$, $C_1A_2$, $C_1B_2$ to conduct, in that sequence, for a fixed period of time T, so that each of the input line voltages be connected in turn across the load during that pause period of time. The sequence is repeated at a predetermined repetition rate. As illustrated in FIG. 3, such repetitive switching pattern extends over a time period TP defined by the consecutive uniform time frames T, individually indicated at $T_1$, $T_2$, $T_3$, $T_4$, $T_5$, and $T_6$. This switching pattern provides an output voltage wave $V_0$ having a "wanted" fundamental component $V_F$ with a frequency $f_0$ equal to the difference between the AC supply frequency $f_{IN}$ and the repetition frequency $f_{SW}$ of the switching pattern, as explained in the above-mentioned patents.

While FIG. 3 illustrates the operation of a system in which for each bilateral switching unit the conduction interval (T) extends fully between two consecutive switching points NC, e.g. between two ON-coming static switches in the succession ($A_1B_2$, $A_1C_2$, $B_1C_2$, ... $C_1B_2$), FIG. 4 illustrates a system in which the duration of conduction (T) is controlled, e.g. reduced from such maximum duration T to $t_1$. As shown in FIG. 4 this is achieved by shorting the output terminals, that is, the load, during a complementary time interval $t_2 = (T-t_1)$. This is achieved by the pair of switches connected to the same input line ($A_1A_2$, $C_1C_2$, ... $B_1B_2$). Such width-control of $t_1$ within T allows the control of the fundamental output voltage, as explained in either of the two aforementioned patents. This mode of control is characterized by a repetitive switching pattern extending over the time period TP that is defined by six uniformly spaced time frames T labeled $T_1$ through $T_6$. In time frame $T_1$, power switches $A_1$ and $B_2$ are turned ON for the time interval $t_1$. At the end of the interval $t_1$, switches $A_1$ and $A_2$ are turned ON for the duration of interval $t_2$ to short the load and thereby provide a path for the load current. In the next time frame $T_2$, switches $A_1$ and $C_2$ are turned ON for the duration of interval $t_1$ to apply an increment of input voltage $V_{AC}$ to the load. At the end of interval $t_1$ of time frame $T_2$, switches $A_1$ and $C_2$ are turned OFF and switches $C_1$ and $C_2$ are turned ON for the duration of interval $t_2$ of the same time frame to short the load. The rest of the sequence in the switching pattern should be apparent from examination of FIG. 4. It is also obvious from the figure that pulse train $P_1$ defines the time frame T, and thereby the output frequence of the fundamental or wanted output voltage $V_F$ of output voltage wave $V_0$, whereas pulse train $P_2$ defines the relative length of intervals $t_1$ and $t_2$, in the given time frame T, and thus determines the amplitude of the fundamental component $V_F$.

Figure 5:
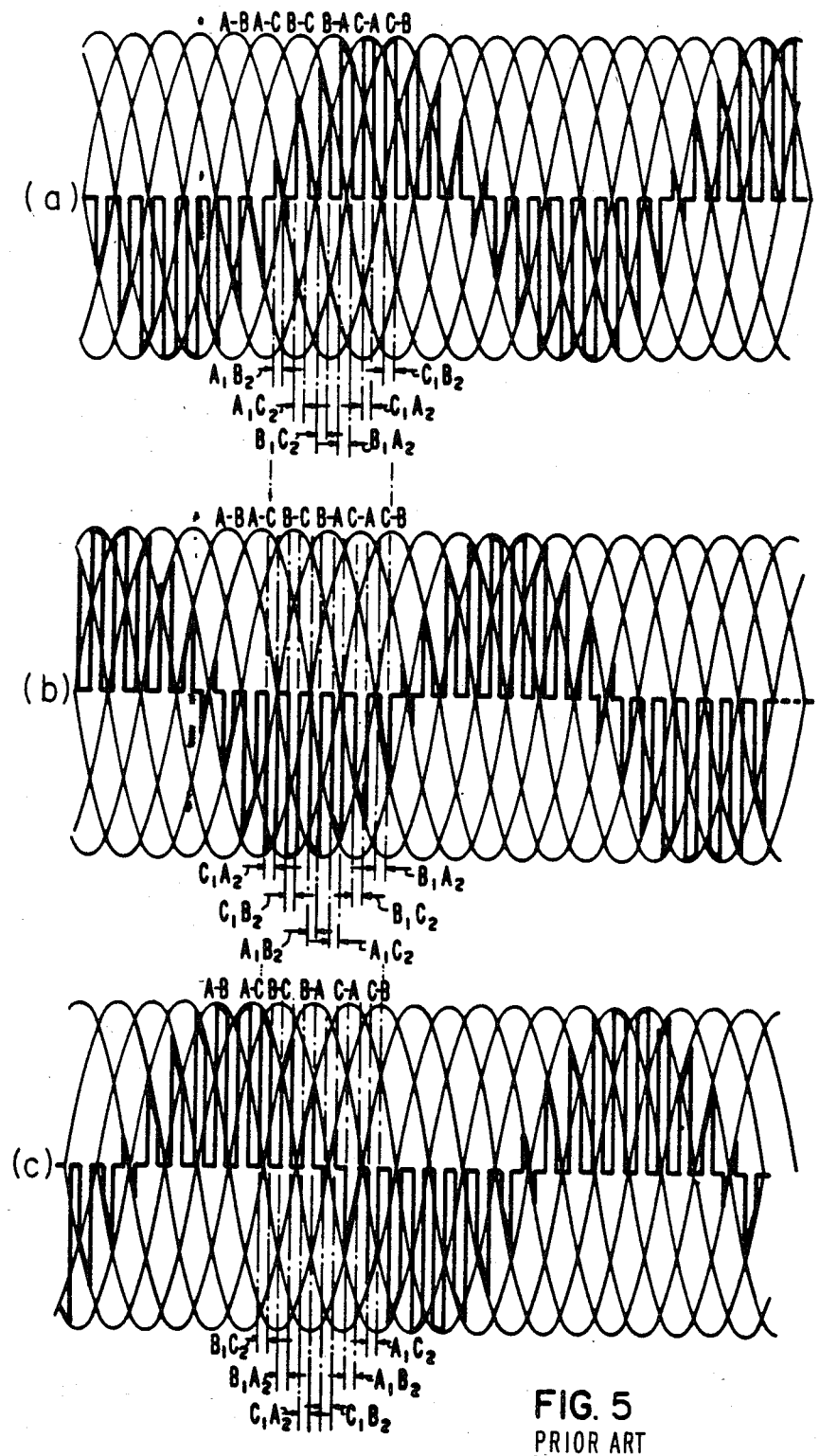
FIGS. 5A-5C are charts with curves comparing the three phases of the UFC system of FIG. 1.

The switching pattern for the three phases of a complete three-phase UFC is shown in FIG. 5.

One disadvantage with the prior art UFC system just described is that the amplitudes of the unwanted (harmonic) components increase in the output voltage as the output frequency is decreased. This is because the time interval $t_1$ during which the input voltage is applied to the motor load, is reduced relative to the uniform time frame T, when the output frequency is decreased, thereby to maintain the output voltage to frequency ratio constant for the AC motor. The decreasing time interval $t_1$ and the increasing time frame T result in increased harmonic currents in the motor at low output frequencies, as illustrated by the motor current waveforms $i_0$ (d) in FIG. 2. Therefore, the motor losses increase with decreasing motor speed.

Another disadvantage is that the amplitudes of the harmonics in the input currents, drawn at the input of the UFC from the three-phase AC power source, also increase as the fundamental component of the output voltage is being decreased by means of decreasing the time interval $t_1$. This appears on FIGS. 6A–6C and in particular FIG. 6C where from the segments $i_A$, which average to $i_{AF}$, are aligned with the segments of the output voltage wave $V_0$ having a fundamental component $V_{0F}$ (see curves (a) and (b) of FIGS. 6A–6C). As a consequence, the filtering requirements at the input terminals of the UFC converter increase considerably as the output frequency (and thus the output voltage) is decreased.

An approach used in U.S. Pat. No. 4,488,216 aims at minimizing and even eliminating these disadvantages. To this effect a voltage control method has been proposed such that the amplitudes of the significant harmonics in the output voltage and input current waves remain essentially proportional to the amplitude of the fundamental component as the amplitude of the fundamental component is decreased at reduced output frequencies.

Figure 6A:
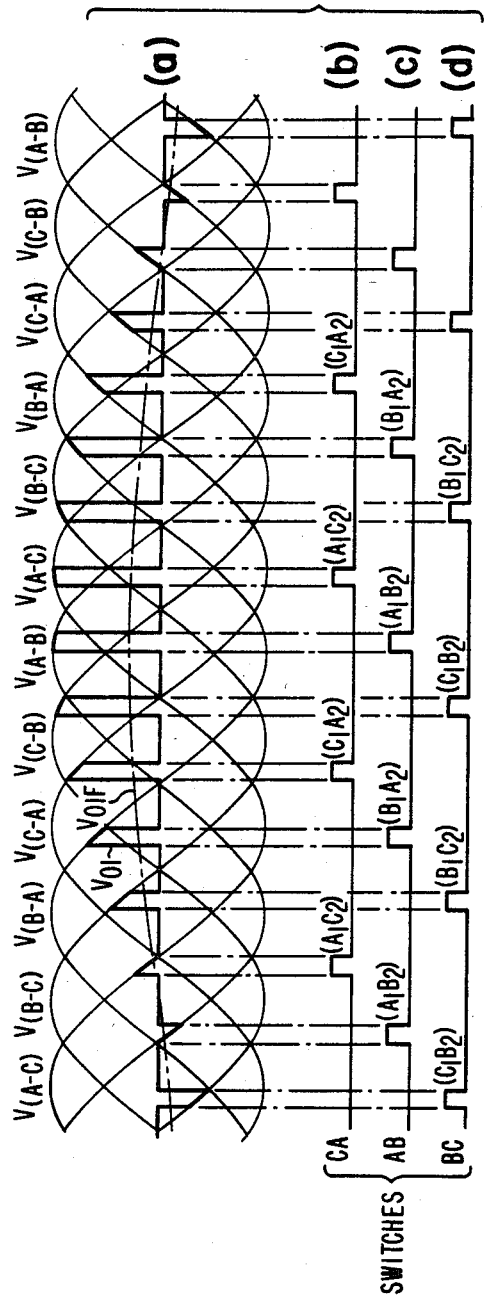
FIGS. 6A-6C give a set of curves illustrating the effect at a reduced output voltage level upon one of the input supply lines with the prior art mode of control.
Figure 6B:
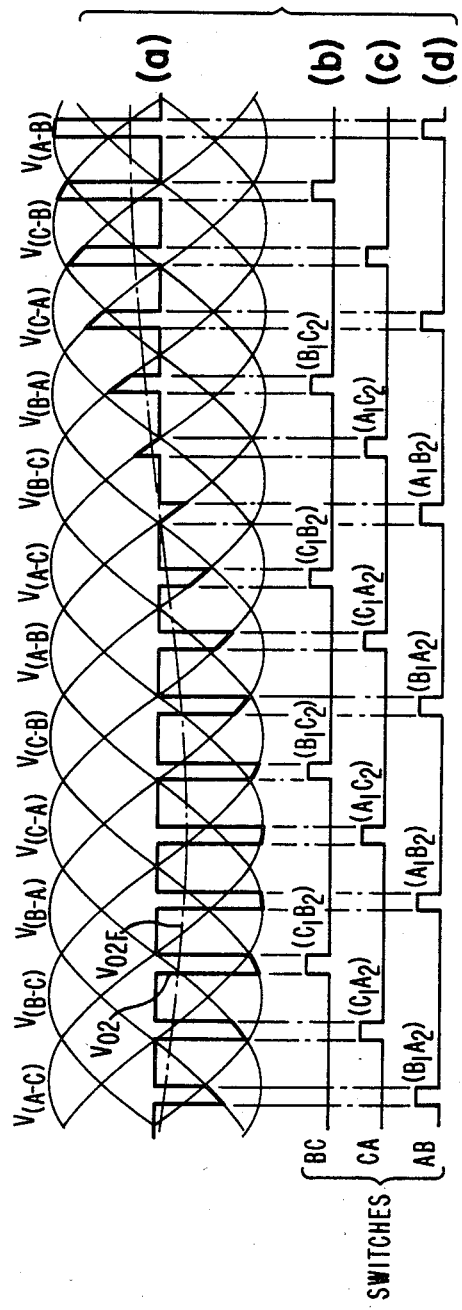
Figure 6C:
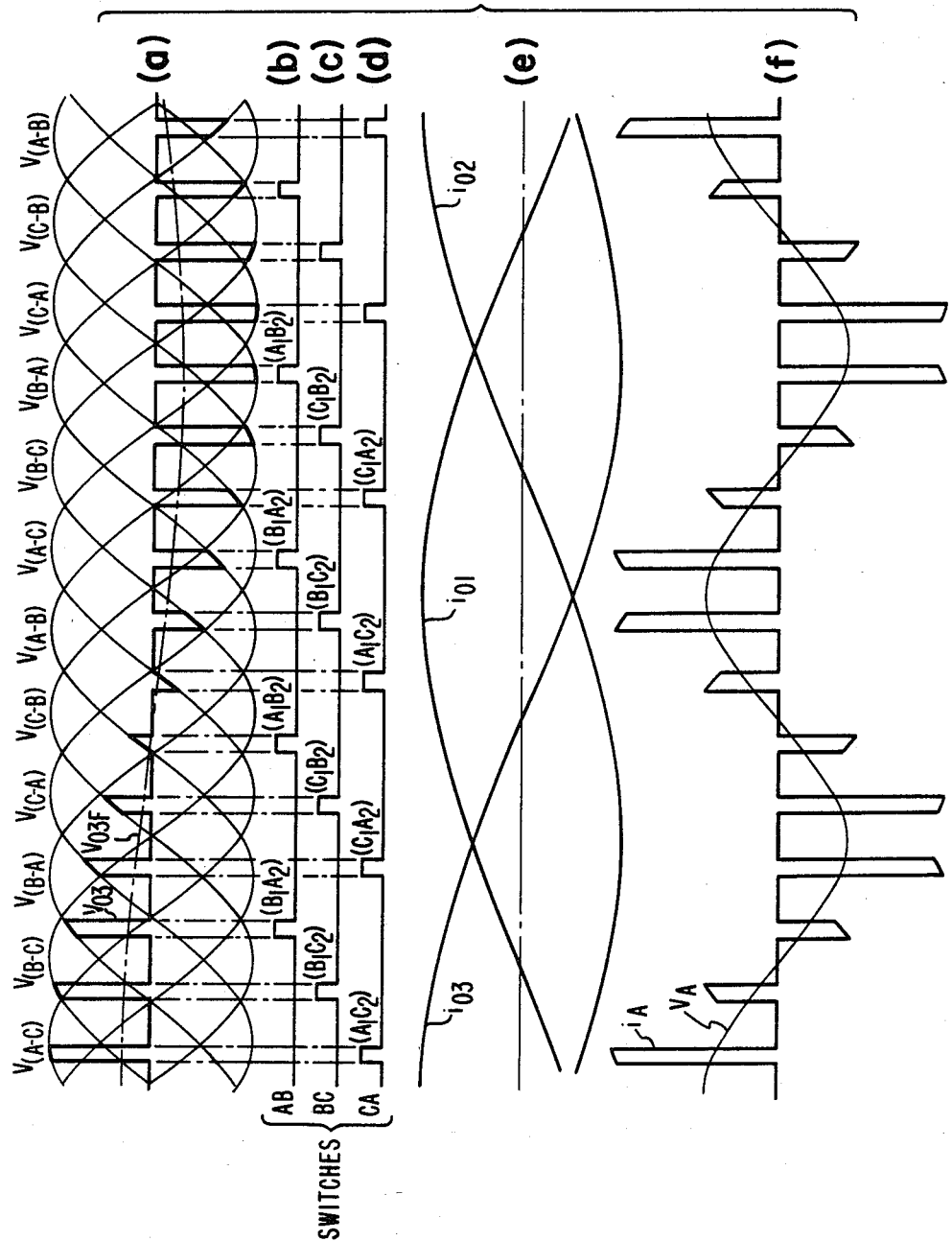

The current wave $i_A$, derived for one of the input supply lines when the UFC operates at a reduced output voltage level, is illustrated in FIG. 6C (under (F)).

Figure 7:
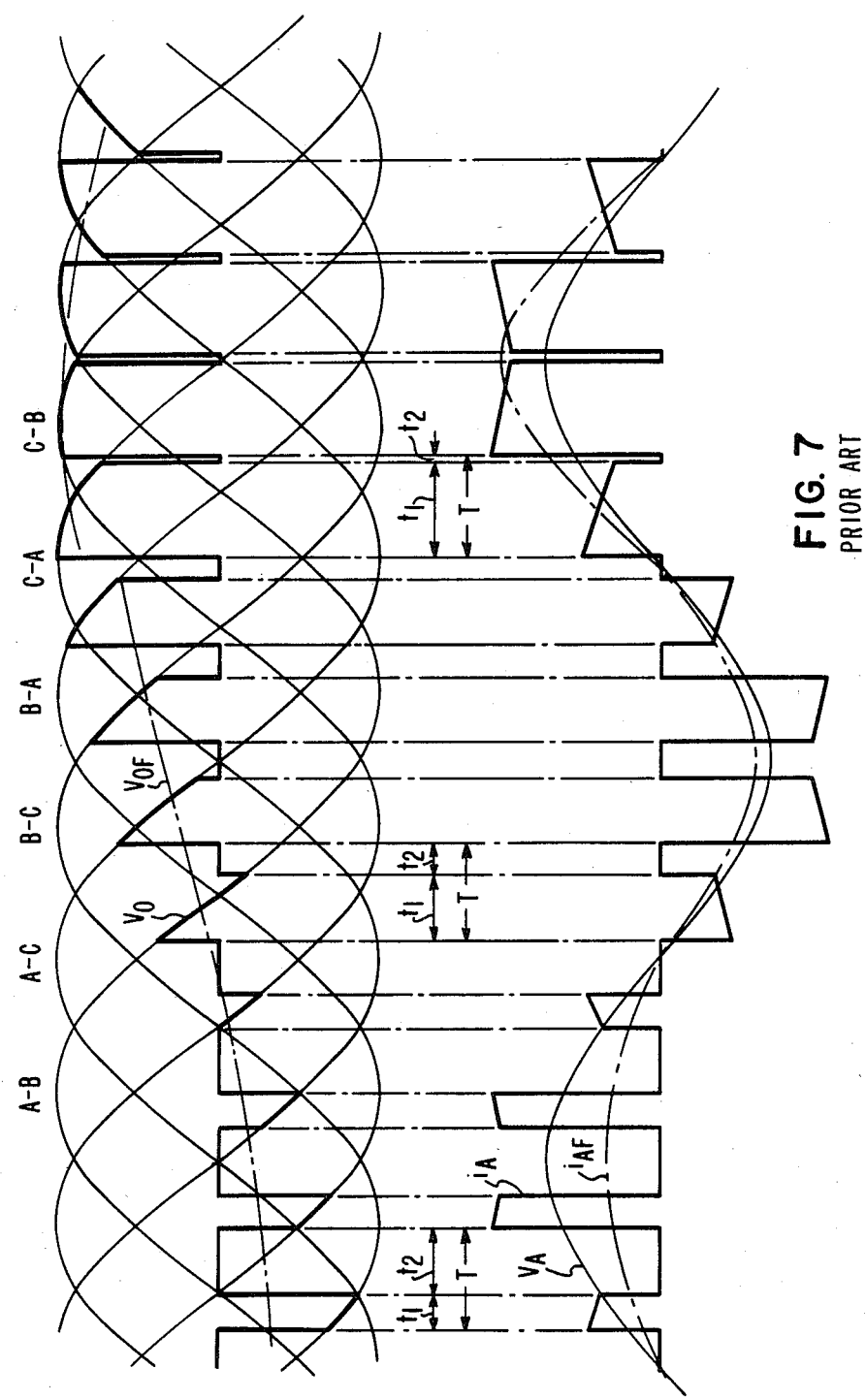
In FIG. 7 are juxtaposed voltage and current curves illustrating equally distributed conduction periods of increased duration and their effect on the harmonics of the input currents drawn from the AC power source.

The reason that the amplitude of the harmonics in the input current wave (thus, the total rms current distortion) increases as the fundamental component of the output voltage is decreased by means of decreasing time interval $t_1$, is illustrated in FIG. 7. It appears that at the constant rated output current (which corresponds to the rated torque of the motor at any speed), the peak instantaneous values of the input current remain essentially the same (these being determined by the amplitude of the constant output current), whereas the average (or fundamental) input current decreases as the output voltage is decreased at reduced motor speeds. In this regard, it is recalled that the power requirements of the AC motor at a fixed output current and at a reduced fundamental output voltage is provided by the AC input supply at a fixed input voltage and at a reduced fundamental input current. With a UFC in the prior art, the average input line current is caused to be reduced by decreasing the "active" time interval, $t_1$, during which voltage is applied to the motor and current is drawn from the AC supply. Since the average (or fundamental) output voltage approaches zero, the input current becomes composed of a number of narrow current pulses, the width of which approaches zero, while the zero current (or "passive") interval $t_2$ between them attains the length of the basic time frame, T, at the same time the "active" conduction time interval $t_1$ approaches zero.

The objective of the present invention is to provide output voltage control so that the instantaneous peak values of the input current and, thereby, the total rms current distortion can be reduced.

Referring again to FIG. 1, the basic power circuit of the UFC consists of three identical power converters, one for each output phase. Each one of these converters draw current from each phase of the AC supply. As illustrated in FIGS. 5 and 6, the conduction intervals of the switching devices with the prior art approach are in coincidence in the time frame of the three power converters. Therefore, all three output terminals (loads) during such common "active" time interval, $t_1$, are connected to the AC input supply to the active switching devices of the power converters. In this situation the total input current drawn from the AC supply is the sum of the three input currents individually drawn by the three converters. As shown by the switching sequence established for the UFC (FIGS. 5 and 6A–6C), actually, two of the three load currents are drawn from any one of three supply lines during any active conduction interval $t_1$. As a consequence, the input current $i_A$, as illustrated in FIG. 6C, is composed of segments of the sum of two corresponding output currents. Since the conduction intervals in the converters are coincident, the instantaneous input current changes in a step-like manner from zero during the "passive" interval $t_2$ to the sum of two output currents, during the "active" time interval $t_1$.

In a motor drive involving a 3 phase induction motor, three independent 6-pulse UFC converters are required ($CV_1$, $CV_2$, $CV_3$ on FIG. 1). Each input line current is the sum of each branch current in the UFC system. Each branch current relative to a UFC converter is a pulse-width modulated current. The three branch currents of the respective three UFC converters can be arranged so as to minimize overlap among them. In other words, the current pulses flowing through an input line, according to U.S. Pat. No. 4,488,216, have been made to be equally distributed by the independent modulations of the three UFC converters, thus, resulting in reduced rms extrabasal current in the input line.

The term "interlaced PWM" has been chosen to name the method of controlling PWM of three UFC converters in a motor drive according to the present invention.

Thus, in order to eliminate the aforementioned drawbacks, it is now proposed to do away with the coincidence between the active time intervals of the three converters and to obtain the equivalent of a time displacement from one converter to the other by splitting each time interval into at least two symmetrically disposed subintervals, and to interlace such subintervals by an equal time distribution over the basic time frame. It is observed that when at reduced output voltage the conduction time intervals are decreased and would result in reduced input current and increased rms input current harmonics, the conduction intervals consisting of such subintervals will never overlap, so that the segments of each of the output currents drawn from the input source will remain distributed over the basic frame. Therefore, the magnitude of the stepwise change in the input current is determined by the instantaneous value of the relevant output current, rather than by the sum of the instantaneous values of two output currents as in the prior art UFC. It can be shown that with the "interlace" type output voltage control technique proposed, the maximum rms value of the input current harmonics can be reduced by about 25 percent.

Figures 8A, 8B:
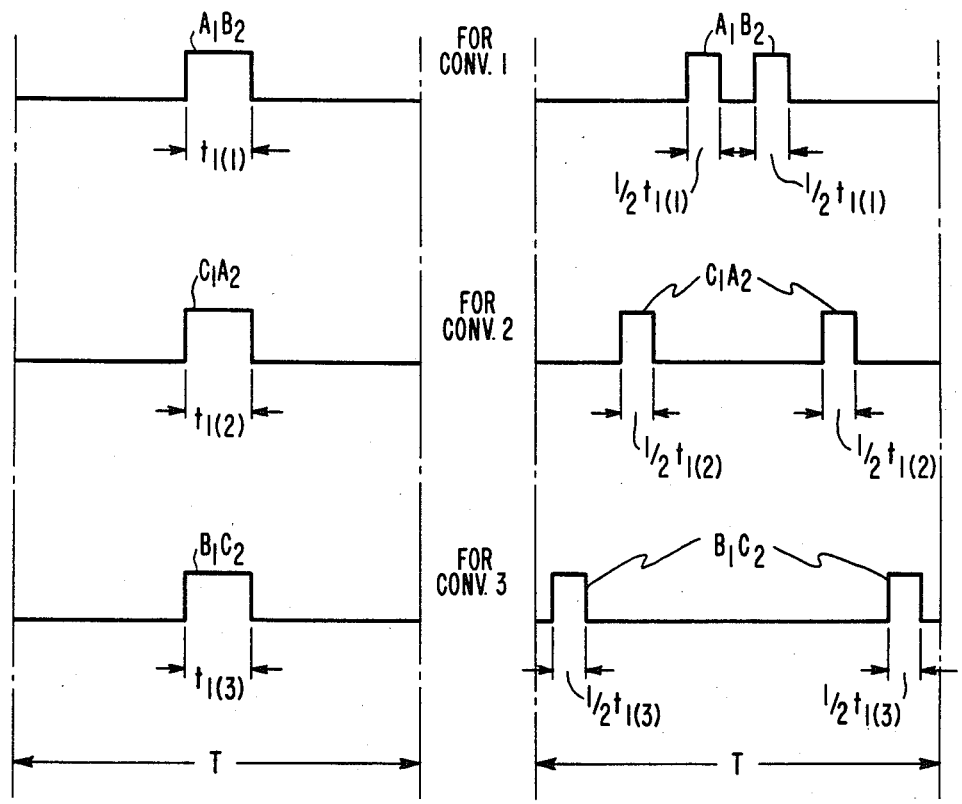
FIG. 8A shows pulses where there is coincidence of the active time intervals between the three converters.
FIG. 8B shows interlaced subintervals according to the invention obtained by symmetrical spacing and symmetrical distribution in time between the three converters.

The basic principle for controlling the switches according to the invention will now be explained with reference to FIGS. 8A and 8B. In FIG. 8A, the basic technique of voltage control according to the prior art is illustrated. As earlier stated, during a variable interval $t_1$ of the basic time frame T, each pair of the output terminals (and thus each phase of the load) is connected to one of the phase-to-phase input voltages. During the remaining part of the time frame T, each pair of the output terminals is short circuited. FIG. 8A shows one particular time frame during the active interval therein. During the active interval, voltage $V_{AB}$ is connected to output 1 by switches $A_1B_2$ in converter 1, voltage $V_{CA}$ is connected to output 2 by switches $C_1A_2$ in converter 2, and voltage $V_{BC}$ is connected to output 3 by switches $B_1C_2$ in converter 3. By reference to FIGS. 1 and 5, it appears that the time intervals $t_{1(1)}$, $t_{1(2)}$, and $t_{1(3)}$ define the active conduction intervals for the relevant switches in converters 1, 2 and 3, respectively. With the prior art mode of control, the active intervals are equally spaced and disposed within the basic time frame T.

For the sake of clarity in FIG. 8A the prior art active time interval $t_1$ has been defined symmetrically about the center of time frame T.

In FIG. 8B illustrating the basic principle of the "interlaced" control mode according to the invention is, the "active" time interval $t_1$, during which the output loads are connected to the AC input supply, is here divided into two identical subintervals. These two subintervals are symmetrically disposed with respect to the central axis of the time frame T. When achieving such distribution within a time frame of the segments of output currents drawn from the input supply these subintervals which represent the active conduction intervals of the switches in a power converter, are not aligned across the time frames from one converter to the next for the three power converters. For example, as illustrated in FIG. 8B, the two time sub intervals, during which switches $A_1B_2$ in converter 1, $C_1A_2$ in converter 2, and $B_1C_2$ in converter 3 are closed, are progressively farther apart so as to ensure that, at reduced output voltage, the current segments, drawn from the input source by the three converters feeding the three phases of the load, will not coincide. The input current waveshapes generated and resulting voltages under the two subintervals control technique illustrated in FIG. 8B are shown in three instances by FIGS. 9A-9C.

Figure 9A:
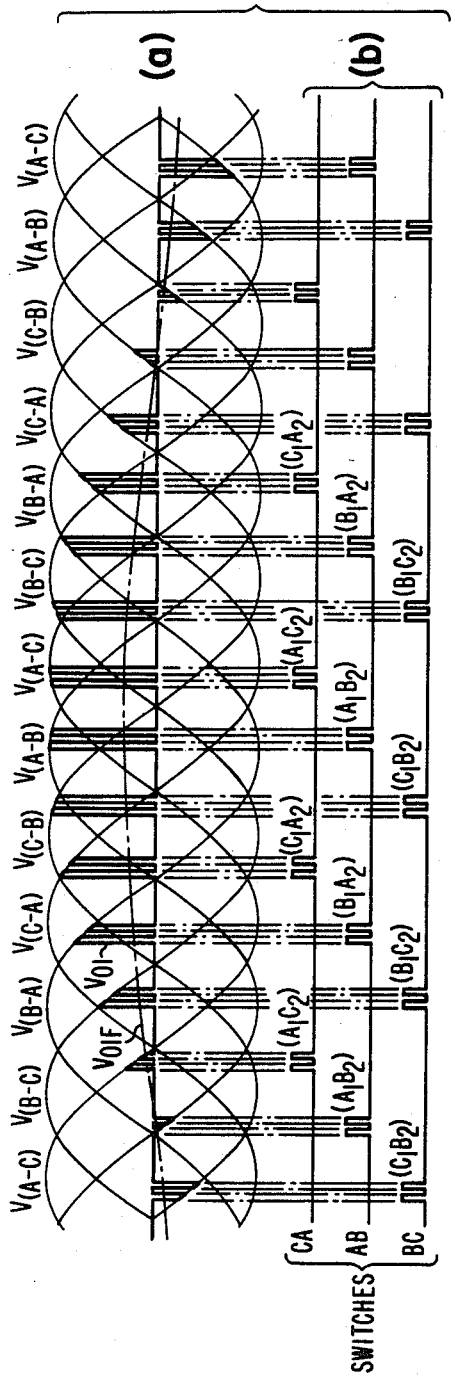
Figure 9B:
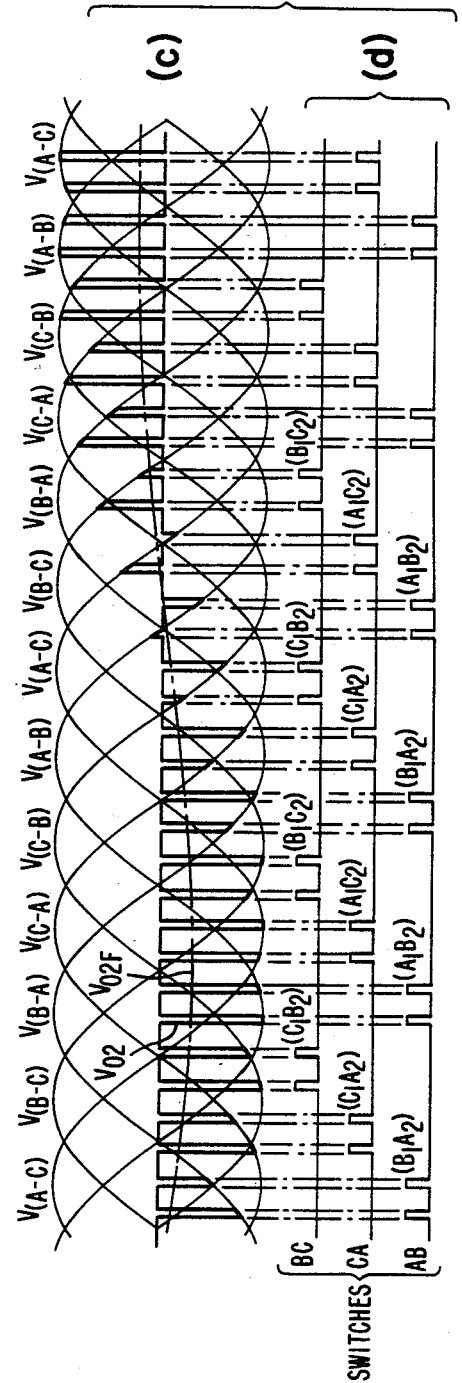

While FIGS. 9A-9C show the active conduction interval at reduced output voltage for the UFC, is the voltage is being increased by increasing the width of the active conduction interval $t_1$, the two output current segments in the input line will come to overlap. Nevertheless, as shown by curves (A) and (B) of FIG. 10, over the whole range of voltge control with the proposed "interlaced" type control method, the rms value of the input current harmonics is significantly reduced (curve (B)), as opposed to the rms value obtained with the prior art "coincidental" control technique (curve (A)).

The proposed technique of "interlacing" the active conduction intervals of the switches in the three power converters can be implemented in many different ways. For example, the active interval $t_1$ could be divided into more subintervals, rather than two, and these can be spaced in various ways around the three converters and in the common basic time frame T, to achieve interlacing with similar results. Also, the spacing may change. The major rule for applying the technique of "interlacing" in the UFC voltage control remains to keep the spacing of the sub intervals *symmetrical* with respect to the center of the basic time frame T, thereby to ensure that the relative phase position of the three output voltages will remain the same when the amplitude of the fundamental output voltage is varied.

The "interlaced" PWM approach for the three UFC converters proposed here in order to reduce the input extrabasal current will achieve this without introducing any phase shift unbalance among the UFC output voltages for the fundamental frequency. Three different sets of existence functions, described hereinafter as a preferred embodiment are used which are derived from existence functions relative to the conventional symmetrical double PWM UFC system type. With this approach, calculations have shown that a considerable amount of reduction of the input rms extrabasal current is effectively achieved.

Figure 11:
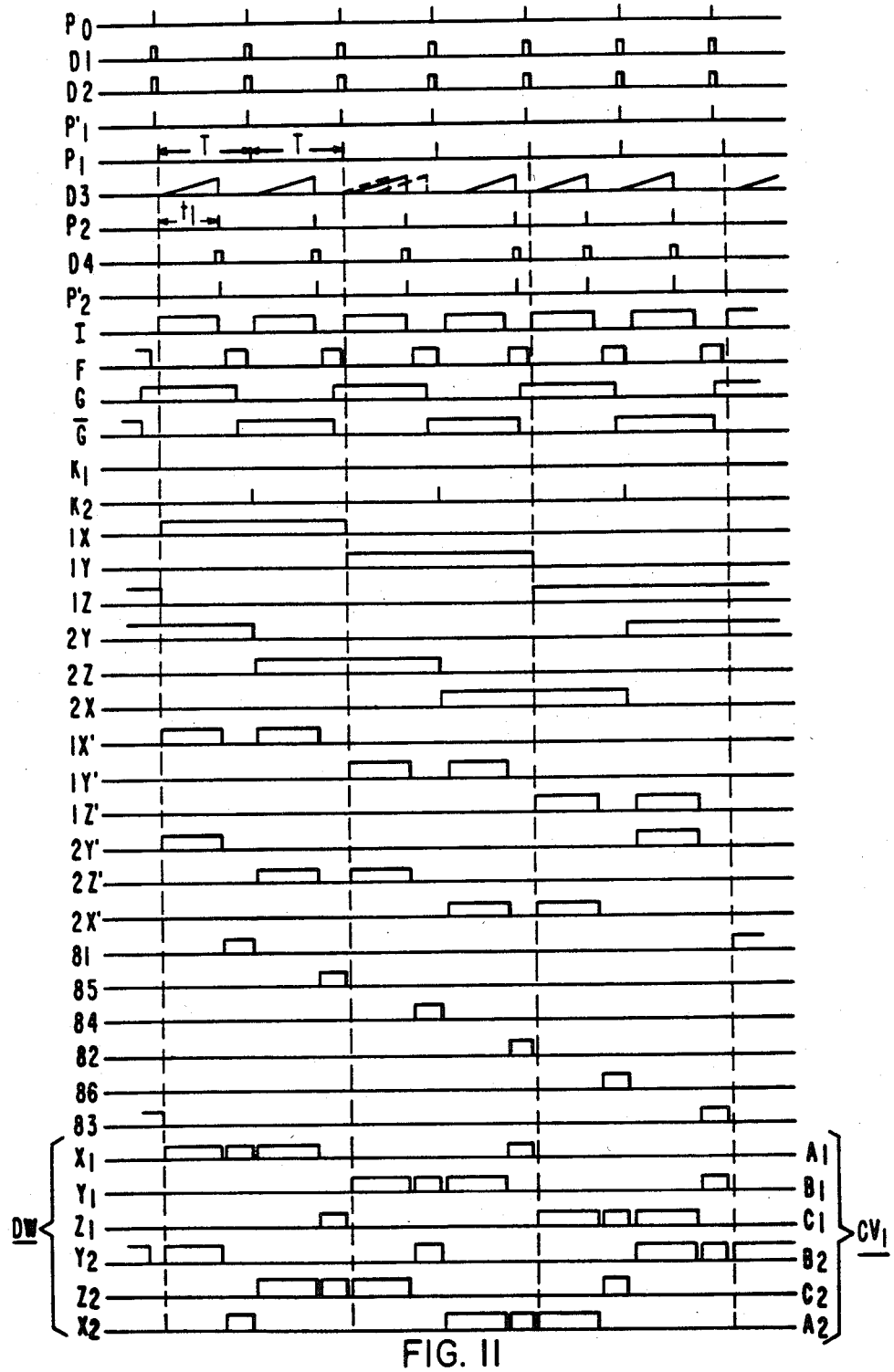
FIG. 11 is a chart of curves showing the generation of signals P1, P2 of FIG. 1 and the derivation of driver signals for the converters in the system of FIG. 1.

FIG. 11 is a chart of curves borrowed from U.S. Pat. No. 3,470,447 and U.S. Pat. No. 3,493,838 of L. Gyugyi et al. For the purpose of this description, these two U.S. Patents are hereby incorporated by reference. Before considering the implementation of the new control method involving signals $P_1$ and $P_2$ of FIGS. 1 to 4, the conventional method explained in U.S. Pat. Nos. 3,470,447 and 3,493,938 of L. Gyugyi et al. will be first summarily recalled.

It may be noted that to connect any pair of lines in FIG. 1 to the load requires a switching unit having at least two bilateral switches BS. It is thus seen that the respective switching units $A_1B_2$, $B_1A_2$, $A_1C_2$, $C_1A_2$, $B_1C_2$ and $C_1B_2$, when individually operated, can effect six different circuit configurations involving the input lines and the load, each of the circuit configurations involving a pair of the input lines and the load in a particular one of the two possible reversely related modes of connection. Thus each of the switching units when turned ON provides a different one of six different circuit configurations between said input lines and the output circuit, each of said circuit configurations interconnecting the load and a pair of the input lines. For purposes of discussion, the individual bilateral switches BS are assumed to be perfect, that is they can be closed and opened at any given time instant, and when closed, the current is free to flow in either direction at all times.

Let it first be assumed that control circuit CT of FIG. 3A is so arranged that switching units $A_1B_2$, $A_1C_2$, $B_1C_2$, $B_1A_2$, $C_1A_2$, $C_1B_2$, are allowed to conduct in that sequence for a fixed period of time T, so that each of the input line voltages is in turn connected across the load for the same interval of time, the sequence being repeated at a predetermined repetition rate R. As is illustrated in FIG. 4, this cyclic or repetitive switching pattern extends over a time period TP defined by six consecutive uniform time frames T, individually indicated at $T_1$, $T_2$, $T_3$, $T_4$, $T_5$ and $T_6$. Each switching unit is ON for a full time frame T as indicated by the switching curve SW in FIG. 4. This pattern of switching provides an output voltage wave $V_0$ having a "wanted" fundamental $V_{OF}$ with a frequency $f_0$ equal to the difference between the frequency $f_I$ of the input alternating current and the repetition frequency fsw of the switching pattern. The system and above type of control which produces this output voltage waveshape is potentially well suited to the speed control of an AC machine for the following reasons: A wide output frequency range is possible; frequencies on either side of line frequency can be obtained; the transition through line frequency is without incident; the frequency of the lowest harmonic component is widely separated from the "fundamental" frequency and there are no DC or subharmonic components.

While this type of control has its advantages it is considerably restricted in its field of application because, although frequency control is possible, control of the output voltage cannot be achieved, except by controlling the input voltage. Thus this type of control cannot be economically applied to the speed control of an AC machine.

The conduction angle or dwell time of each switching unit is for the full extent (assuming perfect switches) of its associated time frame T. For example it is readily seen in FIG. 3, that for the time frame $T_1$, switching unit $A_1B_2$ applies the input voltage A–B to the load for the full duration of the frame. In the next frame ($T_2$), switching unit $A_1C_2$ is turned on to apply voltage A–C to the load for the full duration of the frame $T_2$, and so on.

The switches in each of converters $CV_1$, $CV_2$, $CV_3$ are driven under the prior art control mode in accordance with six drive waveforms DW shown at the bottom of FIG. 7 and referenced at their left ends as $X_1$, $Y_1$, $Z_1$, $Y_2$, $Z_2$ and $X_2$, except that the sets of drive waveforms for each of the converters is displaced 120° from the drive waveforms for the next converter. For example, if these drive waveforms are arbitrarily assigned to the switches of converter $CV_1$ the distribution indicated at the right end of the waveforms, then the drive waveforms for converter $CV_2$ will be the same except displaced by 120° from the $CV_1$ set of drive forms, and the drive waveforms for converter $CV_3$ will be the same except displaced 120° from the drive waveforms of converter $CV_2$. A common control circuit produces the set DW of drive waveforms and distributes them between the three converters $CV_1$, $CV_2$, and $CV_3$.

The repetitive rate of pulses $P_1$, $P_2$ of FIGS. 1, 2 and 4 is provided by a timing waveform generator having a clock the output frequency of which is adjustable in response to adjustment of the magnitude of a reference voltage applied through setpoint SP of FIG. 1. Thus, all the curves of FIG. 7 are along the same relative time base. The output of the generator consists of a train of short duration pulses $P_0$, uniformly spaced and occurring at regular time intervals. Pulses $P_0$ are fed to a circuit introducing a fixed time delay $D_1$. This results in output pulses $P'_1$. Pulses $P'_1$ are fed to another time delay $D_2$, thereby to generate output pulses $P_1$, further delayed with respect to pulses $P_0$.

Figure 10:
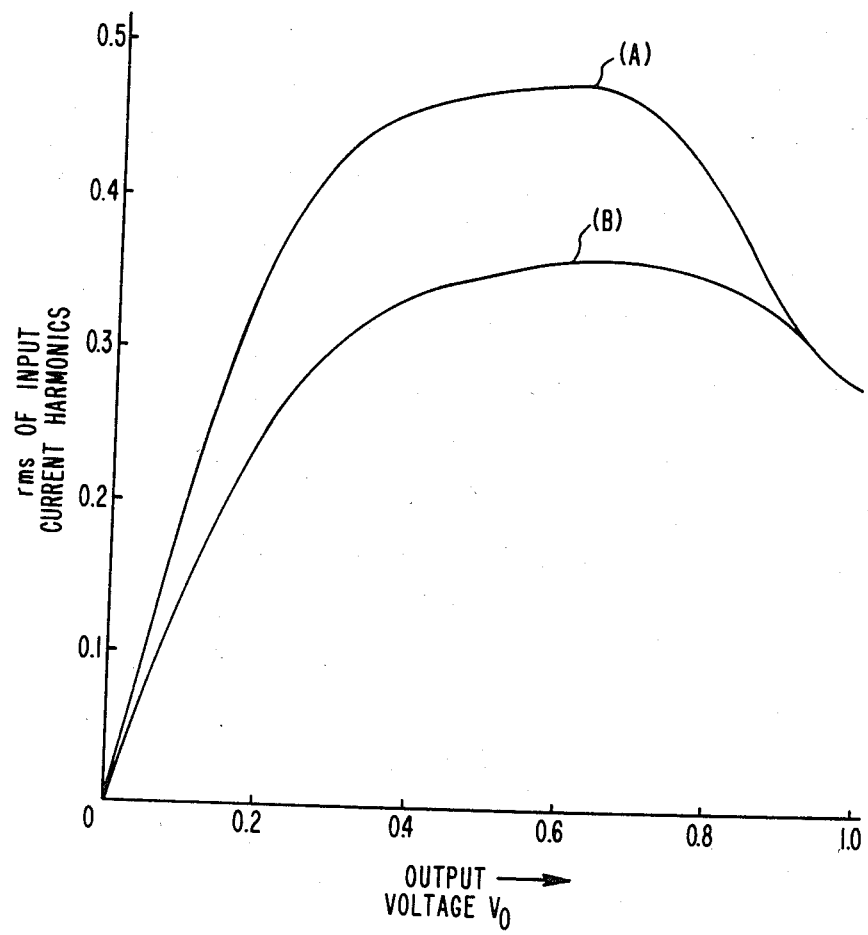
FIG. 10 shows the effect of the technique of FIGS. 8B and 9A-9C upon the EMF value of the input current harmonics.

Pulses $P_1$ are fed to a variable delay circuit providing output pulses $P_2$, delayed by a time $t_1$ with respect to pulses $P_1$. This time delay is shown as an adjustably timed ramp function $D_3$, the output trailing edge of which is differentiated to produce the pulses $P_2$. The adjustability of the timing waveform is symbolized by two random adjustments shown in dotted form on $D_3$. Pulse I of FIG. 10 is defined by a flip-flop in response to the delayed pulse $P_2$ or, in the event of the time delay setting of delay $D_3$ be greater than the interval between pulses $P_1$ and the reset pulses $P_0$, by the latter pulse $P_0$. Thus pulses $P_0$ serve as "end stop" pulses and mark the limits of periods $t_1$. Since the delay between pulses $P_0$ and $P_1$ is relatively short, the maximum possible time, $t_1$ becomes then, nearly equal to the time T. Under such condition the maximum possible practical output voltage is obtained from the UFC as in the case of FIG. 3. Pulse I is reset to zero by pulses $P_1$ (its values are I and $\bar{I}$).

Pulses, $P_1$ are used to initiate conduction of the power transfer switching units ($A_1$, $A_2$, ... $C_1$, $C_2$). Pulses $P_2$ are at the same rate, but adjustably displaced by a chosen time interval $t_1$. These pulses are employed to terminate the conduction dwell time of the switching unit. Thus, pulse train $P_1$ will determine the output frequency and pulse train $P_2$ will determine the output voltage. By varying the positions of pulses $P_2$ relative to pulses $P_1$, the ratio of conduction intervals or dwell times $t_1$ to conduction dwell times $t_2$ is varied, thereby varying the magnitude of the average output voltage, as explained in the aforementioned U.S. patents.

Pulses $P_2$ are also transmitted through a delay $D_4$ to provide pulse train $P'_2$. Pulse train $P'_2$ is delayed with respect to pulse train $P_2$ by a short time necessary to turn OFF the power transfer switching units. Pulses $P'_2$ are used to initiate the conduction of switching units, the purpose of which is to create a "shorting" path interrupting the passing of energy to the load. A pulse train $P'_1$ out of the output of delay $D_1$ slightly precedes pulses $P_1$ thereby to give time to initiate the subsequent power transfer switching units. Thus pulses $P'_1$ are employed to terminate the previous "shorting" conduction interval as shown by signal F.

Thus, a single pulse train with an even rate of pulses per second is employed to initiate the interval $t_1$, and a second pulse train, with the same even rates, but with an appropriate displacement relative to the first train is employed to end the time period $t_1$ and to initiate the time interval $t_2$.

The I signal represents the conduction period for outputting a "slice" of AC voltage from the input power source. The F signal is used for "shorting". Distribution and application of the "slice" and "shorting" control signals is effected with the assist of a ring-counter function. To this effect in a conventional manner the clock pulses $P_0$ are used to trigger a common-trigger type flip-flop producing two rectangular pulse trains, G and $\bar{G}$. Pulses G always overlap even $P_1$ pulses, whereas the $\bar{G}$ pulses overlap the odd $P_1$ pulses. Pulses $K_1$ and $K_2$ are obtained by feeding pulses G and $P_1$ $\bar{G}$ and $P_1$ respectively, to two AND gates. Pulses $K_1$ and $K_2$ are fed to the inputs of two three-stage ring counters, respectively. The outputs of one ring counter are 1X, 1Y and 1Z. The outputs of the other ring counter are shown as 2X, 2Y and 2Z. The respective outputs of waveforms 1X', 1Y', 1Z', 2Z', 2Y' and 2X' are obtained. These are the basic drive waveforms for rendering conductive the power transfer switching units during the "slice" time intervals $t_1$. As previously described, pulses F define the intervals $t_2$ during which the "shorting" switching units conduct. These pulses are distributed into six separate pulse trains 81–86 in a cyclic manner. Waveforms DW represent the driver signals as applied from 1X', 1Y', 1Z', 2X', 2Y', 2Z' and 81–83 once combined after distribution onto the individual bilateral static switches, in the instance of one output phase, namely converter $CV_1$. The relationship between the driver signals and the switching units is as follows: $X_1$ for $A_1$; $Y_1$ for $B_1$; $Z_1$ for $C_1$; $Y_2$ for $B_2$; $t_2$ for $C_2$ and $X_2$ for $A_2$.

For the purpose of fully describing operation and control of the UFC induction motor drive system of the prior art over which the present invention is an improvement, the aforementioned U.S. Pat. No. 3,479,447 and No. 3,493,838 hereby incorporated by reference.

Figure 12:
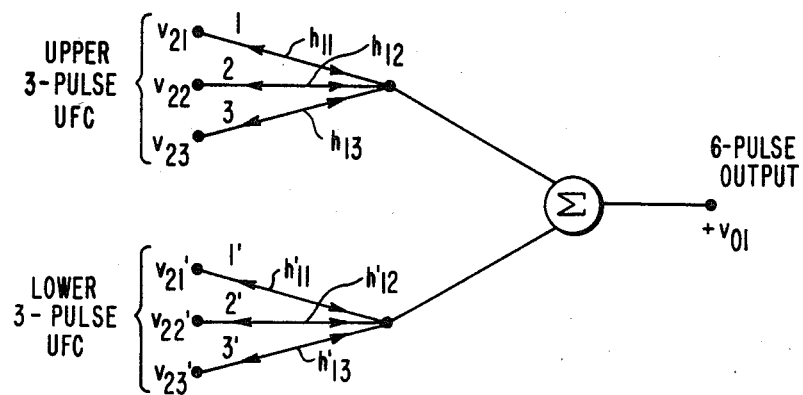
FIG. 12 represents a 6-pulse UFC conceptual configuration involving individual switch existence function between input voltages and output voltages.
Figure 15A:
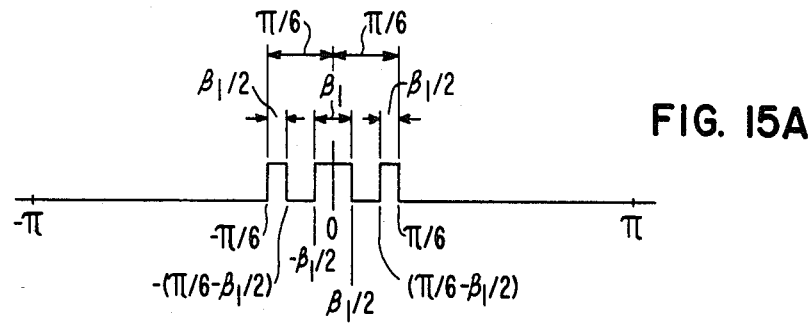
FIG. 15A illustrates the three pulses characterizing the line-to-line existence function of FIG. 14A.
Figure 17:
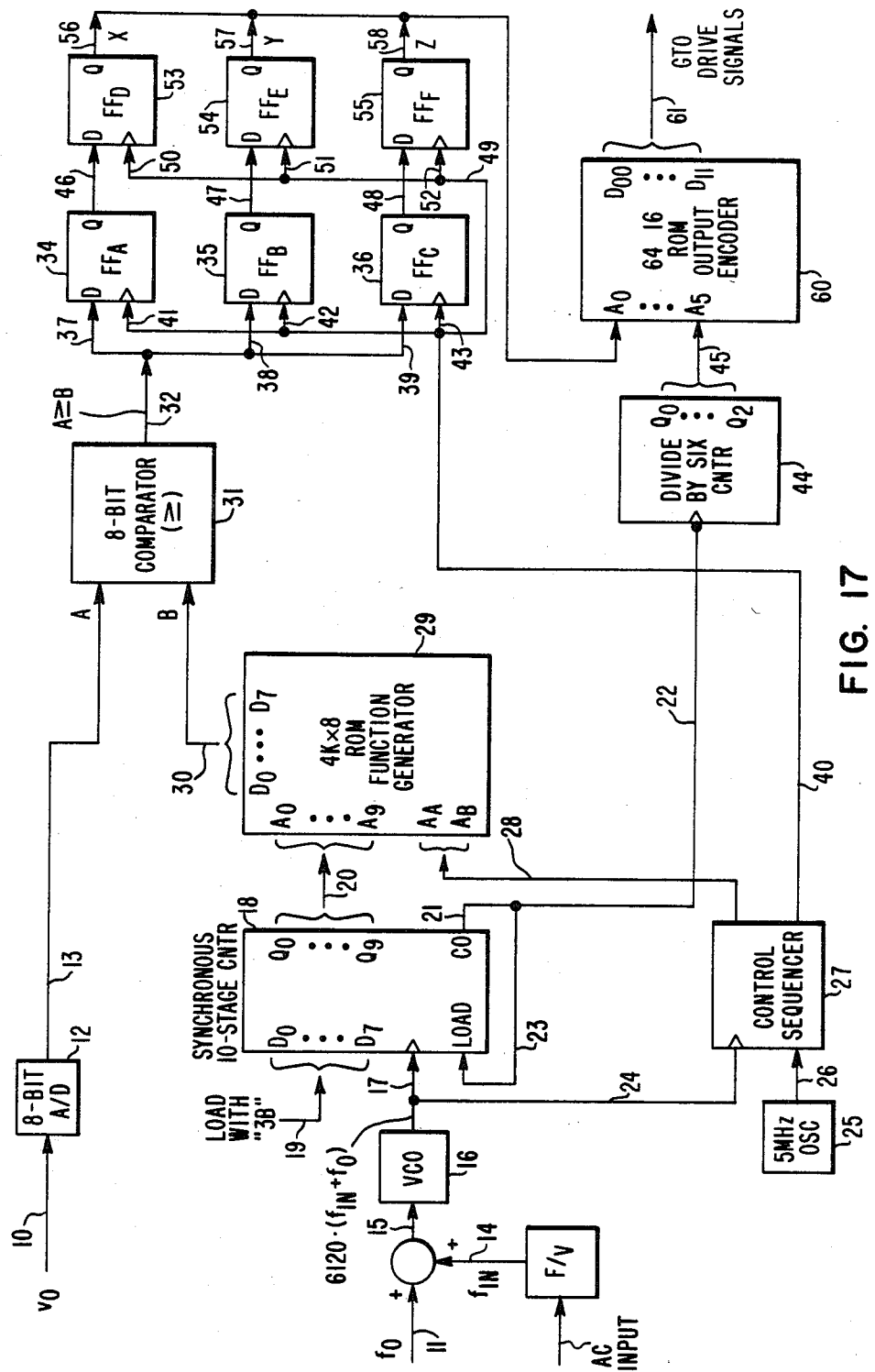
FIG. 17 shows in block diagram the control circuit for implementing the UFC control mode according to FIGS. 13, 14A–14C, 15A–15C and 16.

Conventional control of an Unrestricted Frequency Changer has been implemented by utilizing the three-phase bridge-type converters, the bilateral static switches and the isolated distribution circuits of the prior art UFC apparatus shown in FIGS. 7, 15 and 17, respectively of the incorporated by reference U.S. patents. The basic functional requirements of the control circuits of the proposed UFC apparatus and for the prior art UFC apparatus are identical regarding the control of the output frequency as defined by an external voltage reference, the control of the output voltage as a function of the output frequency (a requirement of the AC motor drive application), the control of the total conduction period $t_1$ of each basic time frame T, to produce the required amplitude of the fundamental component of the output voltage waveforms, and the generation of the repetitive UFC switching pattern sequences defined in FIG. 4 herein. Before describing the mode of generating interlaced control pulses in accordance with the preferred embodiment of the invention of the following is in order:

One configuration of the conventional 6-pulse UFC is shown in FIG. 12. Generally, individual switch existence functions ([h], [h']) provide the expressions for the output voltages and the input currents. Such individual switch existence functions, however, are not needed to obtain expressions for the output voltages and the input currents where a conventional 6-pulse UFC is used. In such case, it is much easier to use the line-to-line correlated existence functions than to use the individual switch existence functions. Accordingly, in this instance the line-to-line correlated existence function (called line-to-line existence functions hereafter) will be derived.

From FIG. 12, it appears that the output voltage $v_{01}$ for a 6-pulse UFC will be:

(1) $v_{01} = V_{I1} + V_{I1'}$ when switches 1 and 1' are closed simultaneously, (2) $v_{01} = v_{I1} + v_{I2'}$ when switches 1 and 2' are closed simultaneously, (3) $v_{01} = v_{I2} + v_{I1'}$ when switches 2 and 1' are closed simultaneously.

Generally, when switches q from upper side and q' from lower side are closed simultaneously, $$v_{01} = v_{Iq} + V_{Iq'}. \quad (2.1)$$

If we let $$\begin{bmatrix} v_{I1'} & -v_{I1} \\ v_{I2'} & = -v_{I2} \\ v_{I3'} & -v_{I3} \end{bmatrix} \quad (2.2)$$

and define the line-to-line voltage of the input ($v_{1q}$) as:

$$v_1 = v_{qq'} = v_{Iq'}, \text{ and } v_1' = v_{q'q} = -v_{1q} \quad (2.3)$$

then, the existence function $g_{pq}$ describing pth output voltage from the qth line-to-line input voltage becomes:

$$g_{pq} = h_{pq} \times h_{pq'}, \quad q' = (q+1)|_{mode\ 3'}\ q = 1, 2, 3 \quad (2.4)$$
$$g_{pq'} = h_{pq'} \times h_{pq} = g_{pq}(wt - \pi),$$
$$q = (q'+1)|_{mode\ 3'}\ q' = 1, 2, 3$$

or, $$[g] = \begin{bmatrix} g_{11} & g_{12} & g_{13} \\ g_{21} & g_{22} & g_{23} \\ g_{31} & g_{32} & g_{33} \end{bmatrix} = \begin{bmatrix} h_{11} \times h_{12'} & h_{12} \times h_{13'} & h_{13} \times h_{11'} \\ h_{21} \times h_{22'} & h_{22} \times h_{23'} & h_{23} \times h_{21'} \\ h_{31} \times h_{32'} & h_{32} \times h_{33'} & h_{33} \times h_{31'} \end{bmatrix} \quad (2.5)$$

$$[g'] = \begin{bmatrix} g_{11'} & g_{12'} & g_{13'} \\ g_{21'} & g_{22'} & g_{23'} \\ g_{31'} & g_{32'} & g_{33'} \end{bmatrix} = \begin{bmatrix} h_{11'} \times h_{12} & h_{12'} \times h_{13} & h_{13'} \times h_{11} \\ h_{21'} \times h_{22} & h_{22'} \times h_{23} & h_{23'} \times h_{21} \\ h_{31'} \times h_{32} & h_{32'} \times h_{33} & h_{33'} \times h_{31} \end{bmatrix} \quad (2.6)$$

Therefore, the output voltage for a 6-pulse UFC is obtained from the line-to-line existence functions and the line-to-line voltages as herebelow:

$$\begin{bmatrix} v_{01} \\ v_{02} \\ v_{03} \end{bmatrix} = [g] \begin{bmatrix} v_{11} \\ v_{12} \\ v_{13} \end{bmatrix} + [g'] \begin{bmatrix} -v_{11} \\ -v_{12} \\ -v_{13} \end{bmatrix} \quad (2.7)$$

where:

$$\begin{pmatrix} v_{11} \\ v_{12} \\ v_{13} \end{pmatrix} = \frac{V_{LL}}{2j} \begin{pmatrix} e^{j\theta I} & - & e^{-j\theta I} \\ e^{j(\theta I - \frac{2\pi}{3})} & - & e^{-j(\theta I - \frac{2\pi}{3})} \\ e^{j(\theta I - \frac{4\pi}{3})} & - & e^{-j(\theta I - \frac{4\pi}{3})} \end{pmatrix} \quad (2.8)$$

Figure 13:
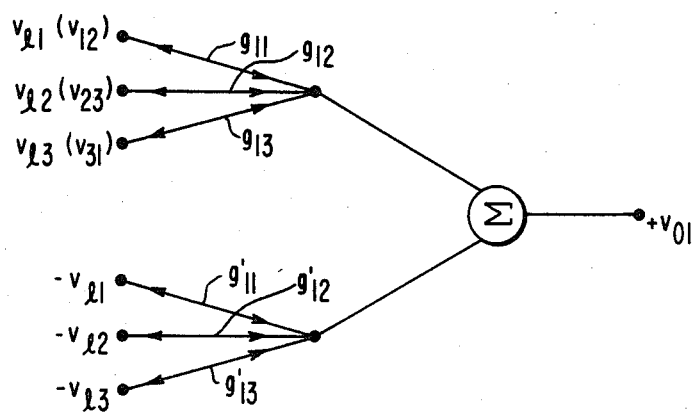
FIG. 13 represents a 6-pulse UFC conceptual configuration involving line-to-line existence functions and line-to-line voltages.

The conceptual configuration of the 6-pulse UFC based on the line-to-line variables is shown in FIG. 13.

Figure 14A:
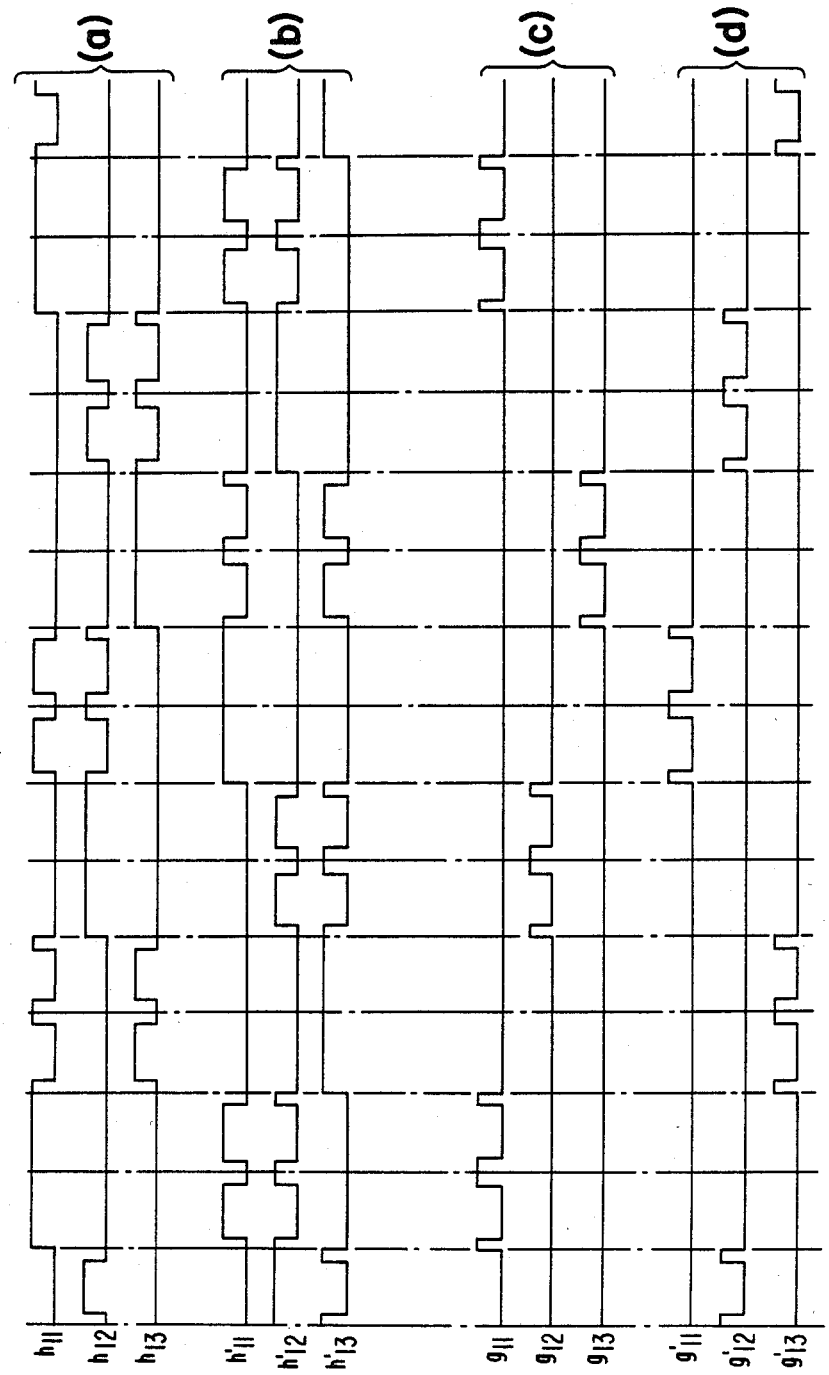
FIGS. 14A–14C show for the respective converters CV1, CV2, CV3 the line-to-neutral existence functions according to FIG. 12 and the line-to-line existence functions according to FIG. 13 with the interlaced PWM method according to the invention.
Figure 14B:
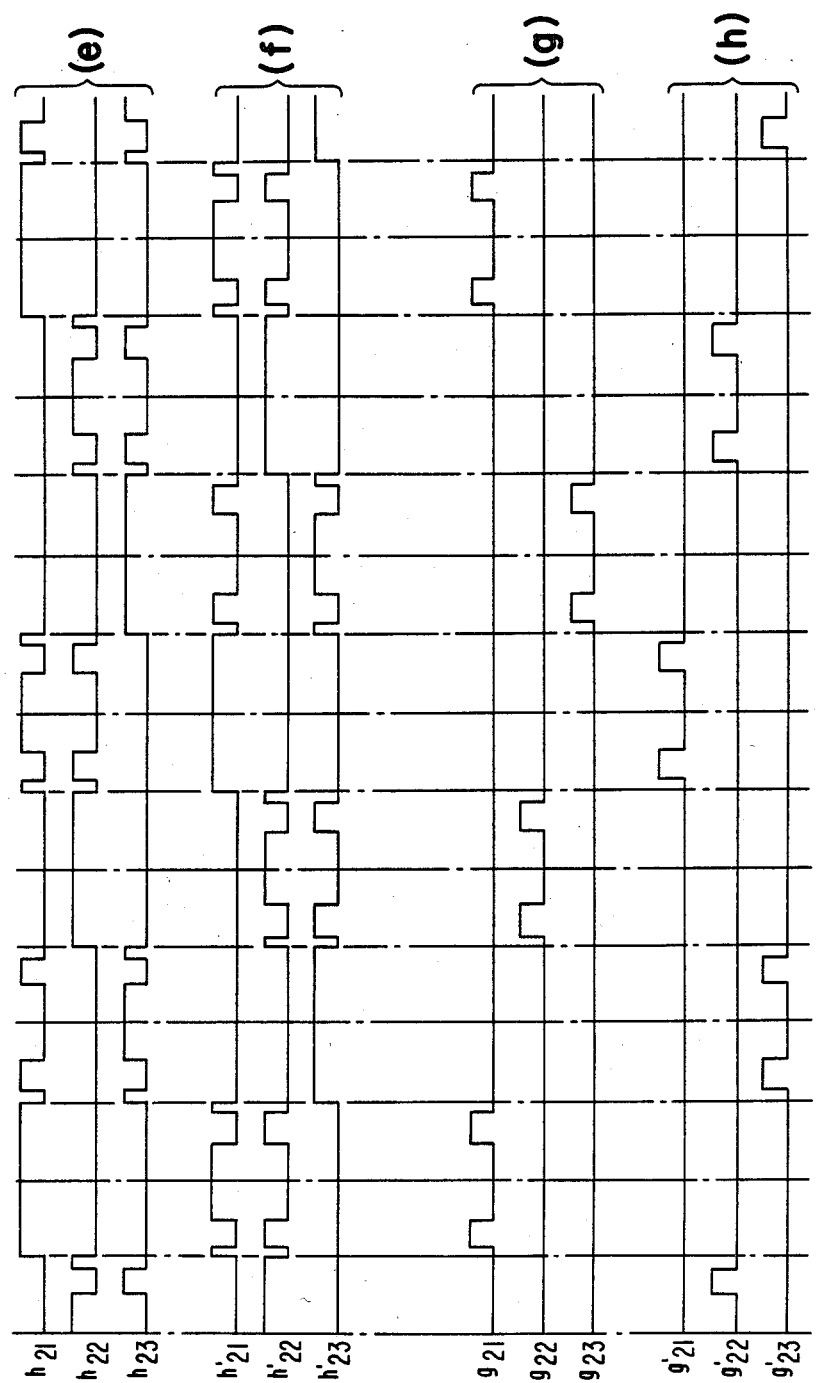
Figure 14C:
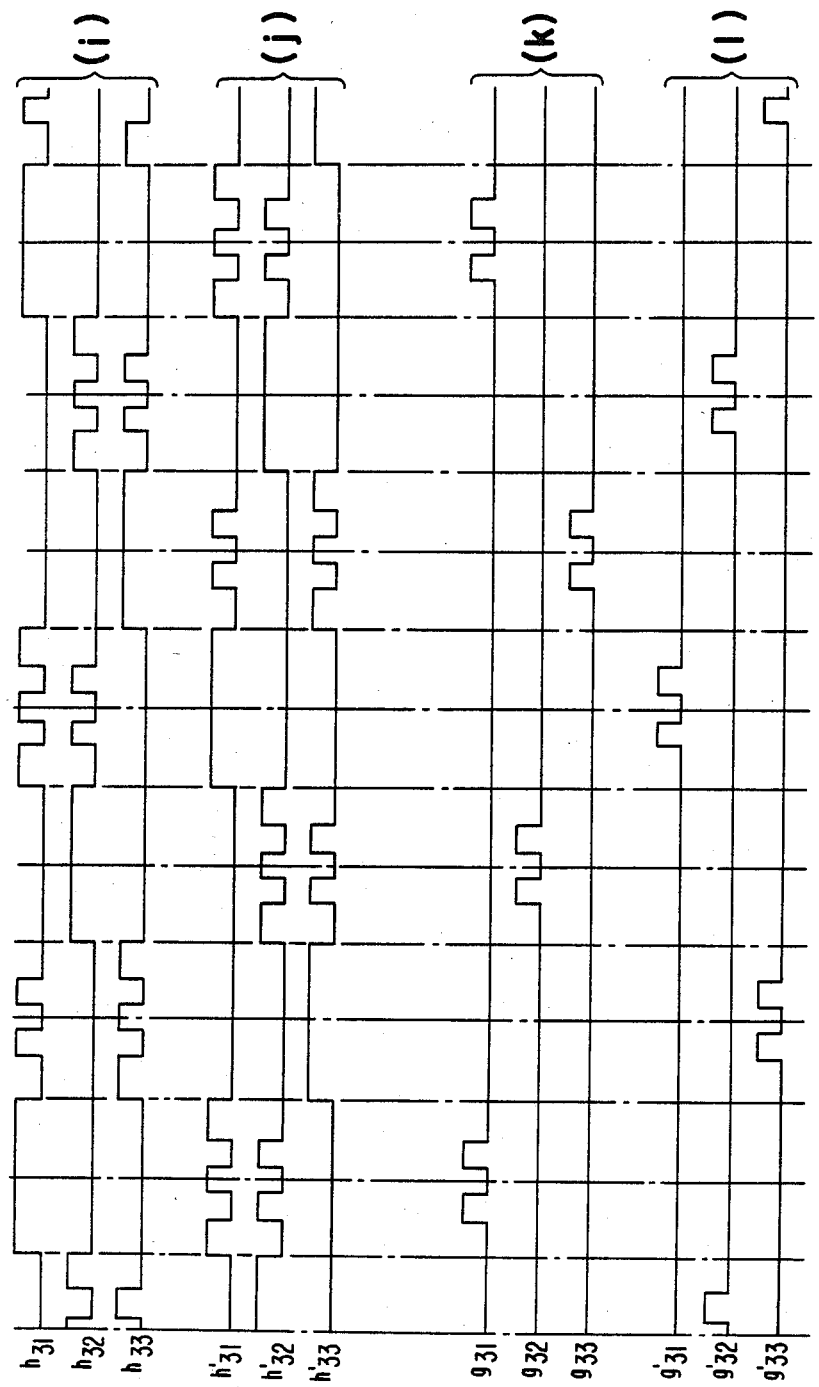

Referring now to the FIGS. 14A–14C, FIG. 14A shows the line-to-neutral existence functions under (a) and (b), and the line-to-line existence functions under (c) and (d) with respect to converter #1 of UFC. FIGS. 14B and 14C are similar curves for converters #2 and #3, respectively, where an interlaced PWM method according to the present invention is used. These existence functions are derived from the symmetrical double PWM type of UFC system so as to minimize the pulse current overlap among parallel lines in the input current, while maintaining output voltage balance for the fundamental frequency (equal amplitude and equal phase difference, $\pm 2\pi/3$).

Considering the existence function for converter #1 of the UFC, the line-to-line existence function shown in FIG. 13A is represented separately in FIG. 14A. In this case, $\beta_1$ is in the range of $$0 \leq \beta_1 \leq \pi/6 \quad (2.9)$$

and the existence function can be decomposed in a Fourier series as:

$$g_{11} = a_{01} + \sum_{n=1}^{\infty} b_n \cos nwt \quad (2.10)$$

where the coefficient $b_n$ is given by $$b_n = 1/\pi \int_{-\pi}^{\pi} g_{11} \cos nwt\ dwt \quad (2.11)$$

In accordance with the relative portions and width of the three pulses of FIG. 14A, $b_n$ is calculated as follows:

$$b_n = \quad (2.12)$$

$$\frac{1}{\pi} \left\{ \int_{-\frac{\pi}{6}}^{-\left(\frac{\pi}{6} - \frac{\beta_1}{2}\right)} + \int_{-\frac{\beta_1}{2}}^{\frac{\beta_1}{2}} + \int_{\left(\frac{\pi}{6} - \frac{\beta_1}{2}\right)}^{\frac{\pi}{6}} \right\}$$

$$= \frac{1}{n\pi} [\sin nwt]_{-\pi}^{\pi}, \text{ for } g_{11} = 1$$

$$= \frac{2}{n\pi} \left\{ \sin n\frac{\pi}{6} = \sin n\frac{\beta_1}{2} - \sin n\left(\frac{\pi}{6} - \frac{\beta_1}{2}\right) \right\}$$

$$= \frac{4}{n\pi} \cos n\frac{\pi}{12} \left\{ \sin n\frac{\pi}{12} - \sin n\left(\frac{\pi}{12} - \frac{\beta_1}{2}\right) \right\}$$

Therefore, $g_{11}$ is from (2.10), (2.12), $$g_{11} = a_{01} + \sum_{n=-\infty}^{\infty} \frac{2\cos n \frac{\pi}{12}}{n\pi} \sin n \frac{\pi}{12} \cdot \quad (2.13)$$

$$\sin n \left( \frac{\pi}{12} - \frac{\beta_1}{2} \right) \cdot \text{EXP } jn \{\theta_I = M_1(t)\}$$

Similarly, $$g_{12} = g_{11}(\theta_I - 2\pi/3), \; g_{13} = g_{11}(\theta_I - 4\pi/3)$$

and $$g_{1q'} = g_{1q}(\theta_I - \pi), \; \forall q, \; q' = 1, 2, 3 \quad (2.14)$$

Figure 15B:
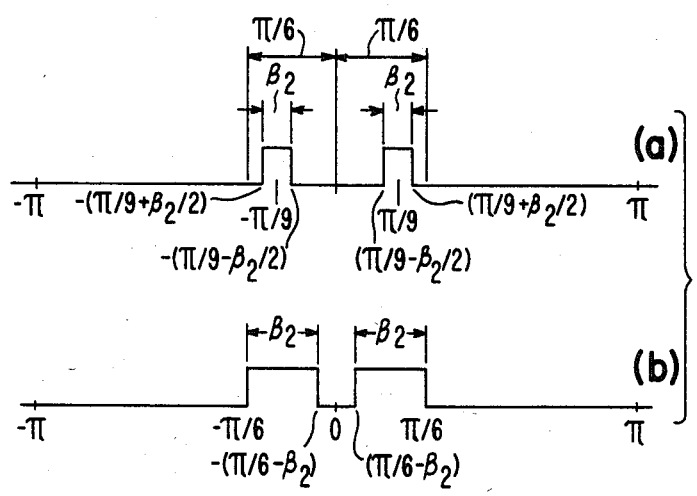
FIG. 15B is the two-pulse relationship for the line-to-line existence function of FIG. 14B.

Referring now to FIG. 15B and the two-pulse disposition characterizing the line-to-line existence function for converter #2 after FIG. 14B, it appears that pulse-width-modulation is divided into two modes: one is the bidirectional modulation centered on $\pm \pi/9$, the other is the unidirectional modulation started from $\pm \pi/6$. The existence functions are difference for each case.

i. for $0 \leq \beta_2 < \pi/9$: modulation to both sides centered on $\pm \pi/9$ $$b_n = \frac{1}{\pi} \int_{-\pi}^{\pi} g_{21} \cos nwt \, dwt \quad (2.15)$$

$$= \frac{1}{\pi} \left\{ \int_{-\left(\frac{\pi}{9} - \frac{\beta_2}{2}\right)}^{-\left(\frac{\pi}{9} - \frac{\beta_2}{2}\right)} + \int_{\left(\frac{\pi}{9} - \frac{\beta_2}{2}\right)}^{\left(\frac{\pi}{9} + \frac{\beta_2}{2}\right)} \right\}$$

$$= \frac{4}{n\pi} \cos n \frac{\pi}{9} \sin n \frac{\beta_2}{2}$$

ii. For $\pi/9 \leq \beta_2 \leq \pi/6$: modulation toward the center from $\pm \pi/6$ $$b_n = \frac{1}{\pi} \left\{ \int_{-\frac{\pi}{6}}^{-\left(\frac{\pi}{6} - \beta_2\right)} + \int_{\left(\frac{\pi}{6} - \beta_2\right)}^{\frac{\pi}{6}} \right\} \quad (2.16)$$

$$= \frac{2}{n\pi} \left\{ \sin n \frac{\pi}{6} - \sin n \left( \frac{\pi}{6} - \beta_2 \right) \right\}$$

Therefore, the existence functions are given by $$a_{02} + \sum_{n=-\infty}^{\infty} \frac{2\cos n \frac{\pi}{9}}{n\pi} \sin n \frac{\beta_2}{2} \text{ Exp } jn \{\theta_I + M_2(t)\} \; 0 \leq \beta_2 \leq \pi/9 \quad (2.17)$$

$$g_{21} =$$

$$a_{02} + \sum_{n=-\infty}^{\infty} \frac{1}{n\pi} \left\{ \sin n \frac{\pi}{6} - \sin n \left( \frac{\pi}{6} - \beta_2 \right) \right\} \text{ Exp } jn \{\theta_I + M_2(t)\} \; \pi/9 \leq \beta_2 \leq \pi/6 \quad (2.18)$$

Similarly, $$g_{22} = g_{21}\left(\theta_I - \frac{2\pi}{3}\right), \; g_{23} = g_{21}\left(\theta_I - \frac{4\pi}{3}\right) \quad (2.19)$$

$$g_{1q'} = g_{1q}(\theta_I - \pi), \; q, \; q' = 1, 2, 3$$

Figure 15C:
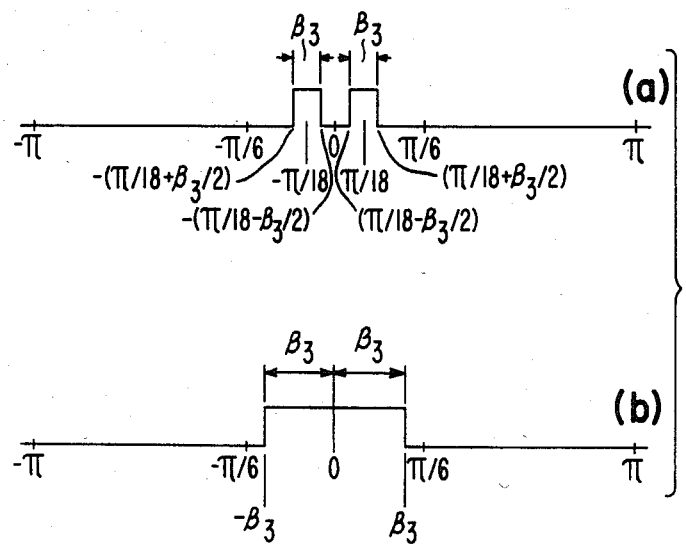
FIG. 15C corresponds to FIG. 14C and shows pulse-width modulation divided into two modes.

Referring now to FIG. 15C which represents the line-to-line existence function according to FIG. 14C, in this case, pulse-width-modulation is also divided into two modes: one is the bidirectional modulation centered on $\pm \pi/18$, the other is the modulation to each side from 0. The existence functions are:

i. for $0 \leq \beta_3 \leq \pi/9$: modulation to both sides centered on $\pm \pi/18$ $$b_n = \frac{1}{\pi} \int_{-\pi}^{\pi} g_{31} \cos nwt \, dwt \quad (2.20)$$

$$= \frac{1}{\pi} \left\{ \int_{-\left(\frac{\pi}{18} - \frac{\beta_3}{2}\right)}^{-\left(\frac{\pi}{18} - \frac{\beta_3}{2}\right)} + \int_{\left(\frac{\pi}{18} - \frac{\beta_3}{2}\right)}^{\left(\frac{\pi}{18} + \frac{\beta_3}{2}\right)} \right\}$$

$$= \frac{2}{n\pi} \left\{ \sin n \left( \frac{\pi}{18} + \frac{\beta_3}{2} \right) - \sin n \left( \frac{\pi}{18} - \frac{\beta_3}{2} \right) \right\}$$

$$= \frac{4}{n\pi} \cos n \frac{\pi}{18} \sin n \frac{\beta_3}{2}$$

ii. For $\pi/9 \leq \beta_3 \leq \pi/6$: modulation to each side centered on 0

$$b_n = \frac{1}{\pi} \left\{ \int_{-\beta_3}^{\beta_3} \right\} = \frac{2}{n\pi} \sin n\beta_3 \quad (2.21)$$

Therefore, from (2.10), (2.20), (2.21), we obtain $$a_{03} + \sum_{n=-\infty}^{\infty} \frac{2\cos n \frac{\pi}{18}}{n\pi} \sin n \frac{\beta_3}{2} \text{ Exp } jn \{\theta_I + M_3(t)\} \; 0 \leq \beta \leq \pi/9 \quad (2.22)$$

$$0 =$$

$$a_{03} + \sum_{n=-\infty}^{\infty} \frac{1}{n\pi} \sin n\beta_3 \text{ Exp } jn \{\theta_I + M_3(t)\}, \; \pi/9 \leq \beta \leq \pi/6 \quad (2.23)$$

Similarly, $$g_{32} = g_{31}\left(\theta_I - \frac{2\pi}{3}\right), g_{33} = g_{31}\left(\theta_I - \frac{4\pi}{3}\right) \quad (2.24)$$

$$g_{1q'} = g_{1q}(\theta_I - \pi), q, q' = 1, 2, 3$$

Figure 16:
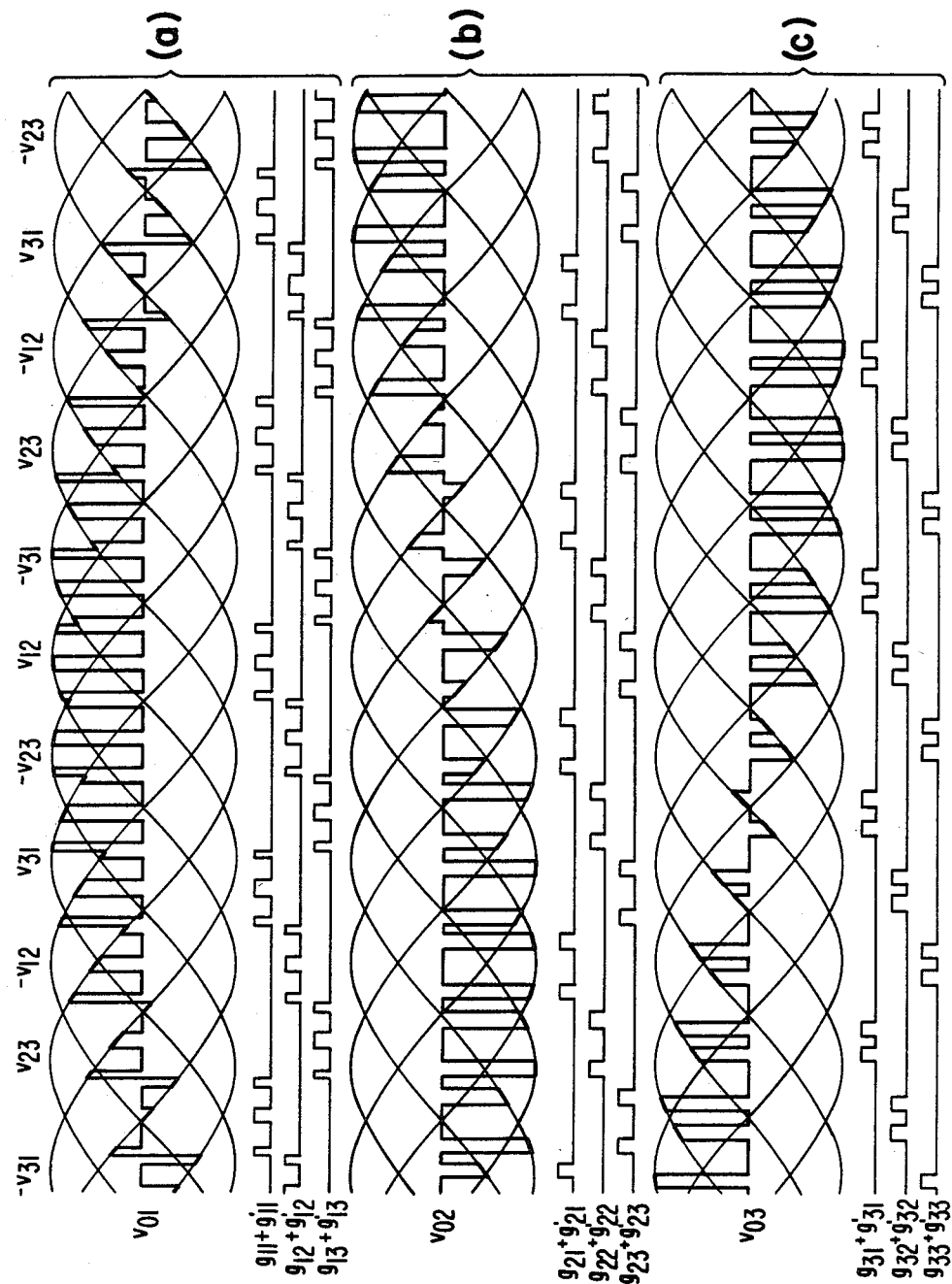
FIG. 16 shows the three 6-pulse voltage waveforms obtained with the existence functions of FIGS. 14A–14C.

FIG. 16 represents the three 6-pulse voltage waveforms obtained when using the existence functions shown in FIGS. 14A-14C.

FIG. 17 shows in block diagram the control circuit for implementing the UFC control mode according to FIGS. 13, 14A-14C, 15A-15C and 16.

The control circuit of FIG. 17 is implemented digitally. Three analog input signals are inputted: (1) the desired output voltage $V_O$; (2) the desired output frequency $f_0$; and (3) the input frequency $f_{IN}$.

Signal $V_O$ is applied on line 10 to an 8-bit A/D converter 12 generating a corresponding digital signal on lines 13. Signal $f_0$ derived on line 11 is combined with signal $f_{IN}$ derived on line 14 by a summer providing on line 15 the signal ($f_{IN}+f_0$). A voltage controlled oscillator (VCO) 16 converts the signal of line 15 into a pulse train of frequency 6120 ($f_{IN}+f_0$) outputted on line 17.

The high frequency pulse train of line 17 is applied to a ten-stage synchronous counter 18 (a solid state device sold on the open-market as a 74LS163A). Counter 18 effectuates a division by size of the inputted frequency $T=1/(f_{IN}+f_o)$. Counting of the pulses normally goes from 0 to 1023 as shown under (a) in FIG. 18. However, in order to have a multiple of six, the 10-bit binary number 3 is loaded by line 19 onto pins $D_0$-$D_9$ into the device and at every counting start, or reset from pin 21, via line 23 such loading is effected, whereby the counter will reach 1023 at top count while having in fact counted only 1020. Counter 18 outputs on 10-bit lines 20 from pins $Q_0$-$Q_9$ the ramp shown in FIG. 18 under (a). The base period is 1020, which represents 1/6 of 6120, the basic frequency of the VCO.

Lines 20 are inputted into pins $A_0$-$A_9$ of a ROM function generator 29 (a solid state device sold on the open market as a 2732A) which includes as addresses, in addition to pins $A_0$-$A_9$, two most significant digit inputs AA and AB. By addressing via lines 28 from control sequencer 27 (clocked by line 26 from a clock 25, typically of 5 MHz frequency) the control sequencer 27 generates the two most significant address bits, $A_A$, $A_B$, such that three data arrays stored in the ROM 29 are sequentially addressed. The lower order address bits, $A_0$ through $A_9$, are generated by counter 18. Illustratively, the manner in which the ROM 29 is mapped is shown in Table I herebelow:

TABLE I

| ADDRESS | $D_0 \ldots D_7$ | ROM OUTPUT |
|---|---|---|
| 4096 | | |
| | | (TIMING WAVE III) |
| 3072 | | |
| 3071 | | |
| | | (TIMING WAVE II) |
| 2048 | | |
| 2047 | | |
| | | (TIMING WAVE I) |
| 1024 | | |
| 1023 | | |
| | | NOT USED |
| 0 | | |

Figure 18:
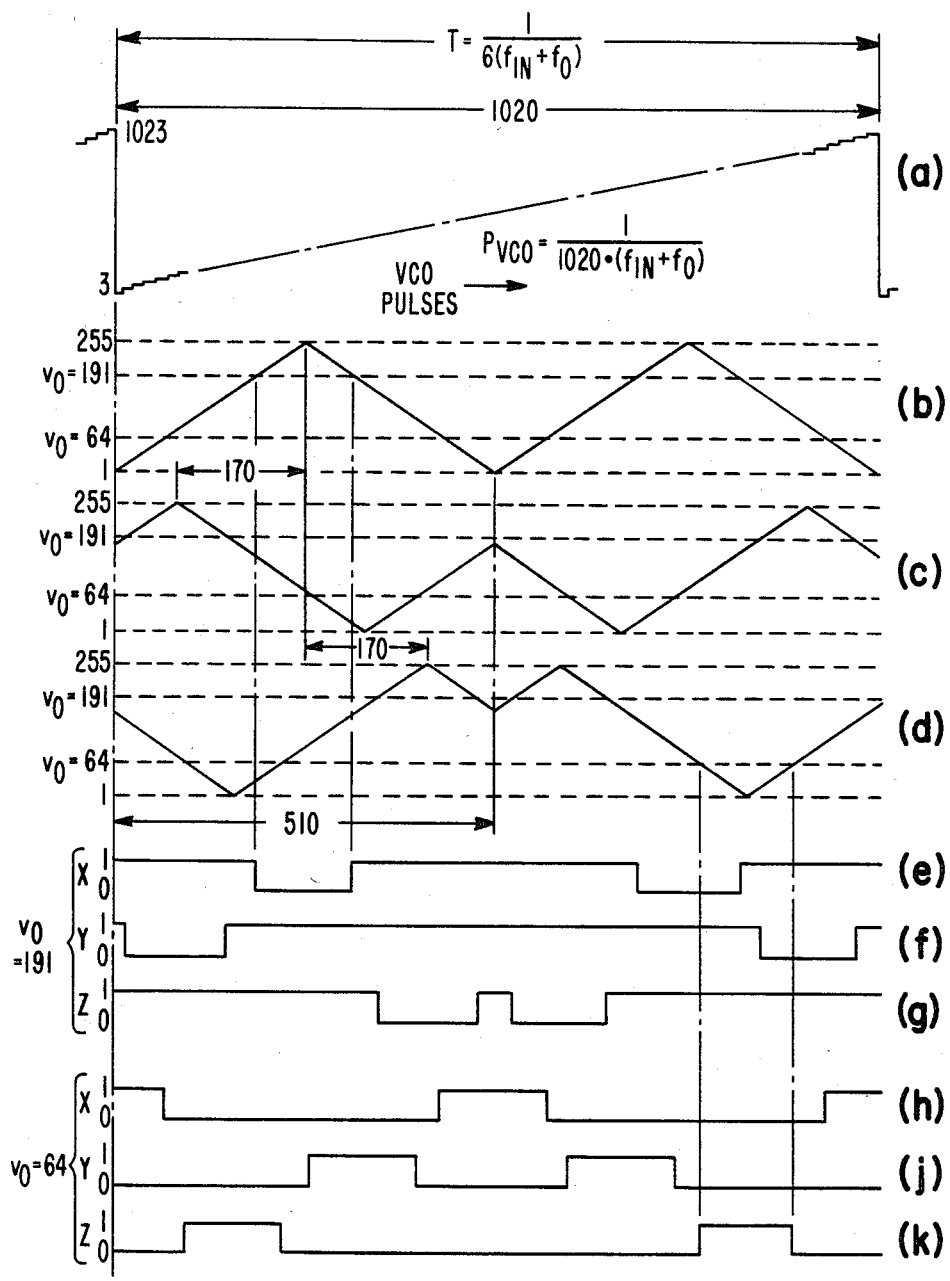
FIG. 18 shows timing waveforms as derived from the ROM of FIG. 17 and the sets of signals for the three UFC converters in specific situations of the signal $V_0$ of FIG. 17.

Within each of the 1024 byte areas of the ROM there are stored bit patterns which generate the timing waveforms I, II, and III shown in FIG. 18. These timing waveforms appear in binary format, with values ranging from 1 through 255, at the data output pins $D_0$ through $D_7$ of ROM 29. FIG. 18 illustrates under (b), (c) and (d) the three timing waves I, II and III so derived, namely ramps of alternatively opposite slopes which have a mirror image about the middle instant of the period T, e.g. at count 510.

In addition, the three timing waves established by the functions stored in the ROM are shifted by 1/6 of the original period (1020) at the input of the ROM. Therefore, the shift is by 170 between timing waves I, II and III. These timing waves are sequentially applied in response to the control sequencer 27 commands of line 28. They range in value from 1 to 255. It is observed that the three timing waves, used in the UFC for the three converters, respectively, need not be triangular as shown in FIG. 18. The ROM can be programmed to provide sinusoidal waves. It may also be programmed to generate any shape, such as could compensate for the non-linearity inherent in a voltage transfer.

A digital comparator 31 effectuates a comparison between the respective timing waves of lines 30 and the 8-bit digital representation derived on line 13 and A/D converter 12, characterizing the reference value of $V_O$ on line 10.

FIG. 18 shows two values of $V_O$, illustratively of: 191 (75% of the maximum of 255 for $V_O$) and 64 (which corresponds to 25%). Under (b), (c) and (d) of FIG. 18 are represented two sets of three signals XYZ of specific logic levels for the three UFC converters which correspond to the cases of $V_O=75\%$ and $V_O=25\%$, respectively. These are the logic levels outputted one line 32 by comparator 31 (a solid state device sold on the open market which can be used to provide the function is 74LS85). The digital comparator produces a "true" or high output (ONE) when the reference $V_O$ is greater than, or equal, to the timing wave. Thus, it is possible to have a duty cycle which range from zero to 100 percent with increments of 1/255, or approximately 0.25 percent. The sequentially generated signals X, Y and Z are latched into flip flops $FF_A$, $FF_B$, $FF_C$, respectively.

Figure 19:
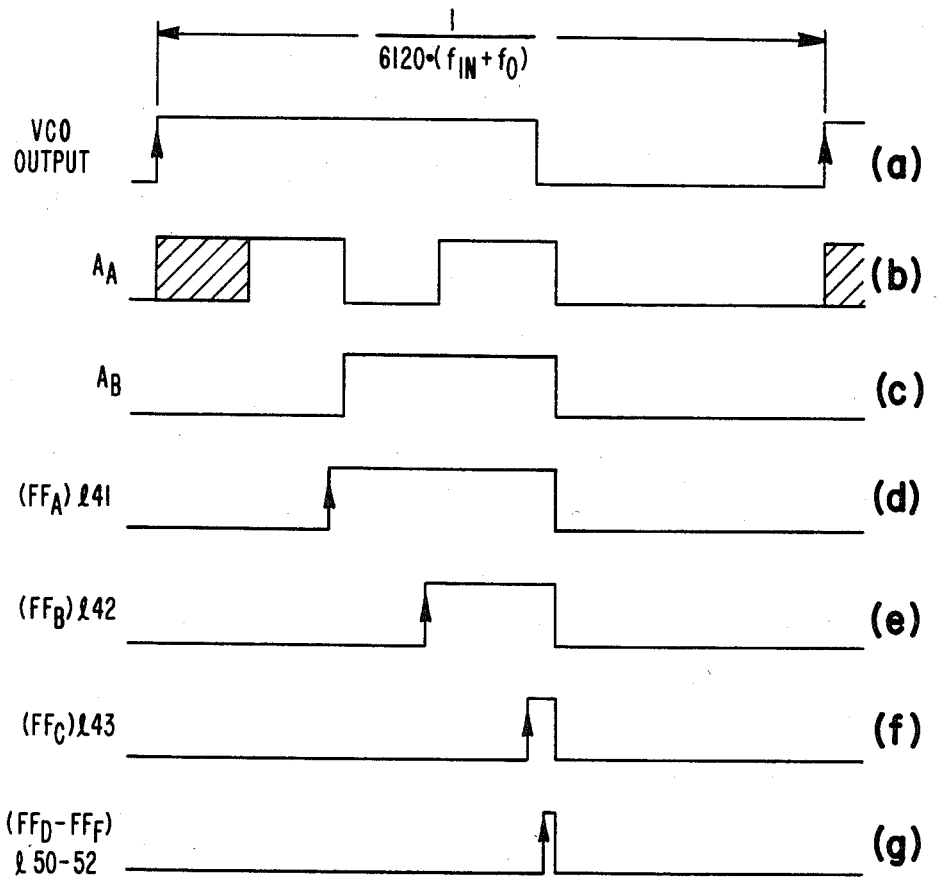
FIG. 19 shows the VCO signal of FIG. 17, the control signals $A_A$, $A_B$ addressing the function generator of FIG. 17 and curves illustrating the operation of the flip-flops thereof.
Figure 22:
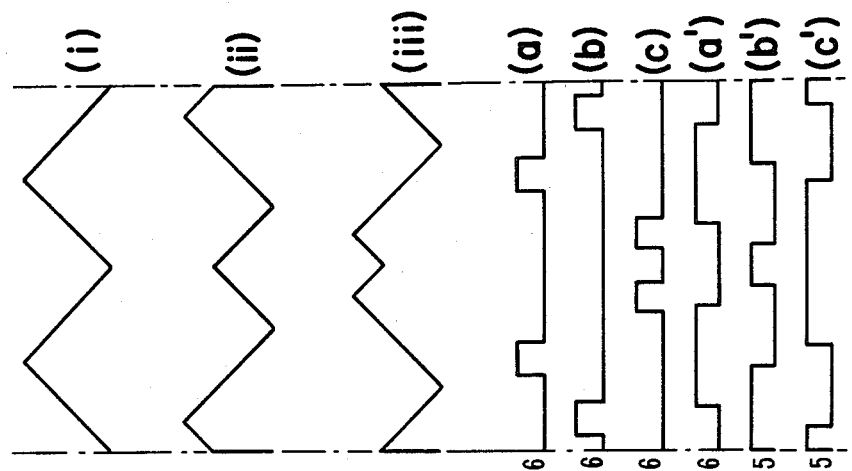
FIGS. 20–27 illustrate with curves different modes of interlacing according to the invention.
Figure 21:
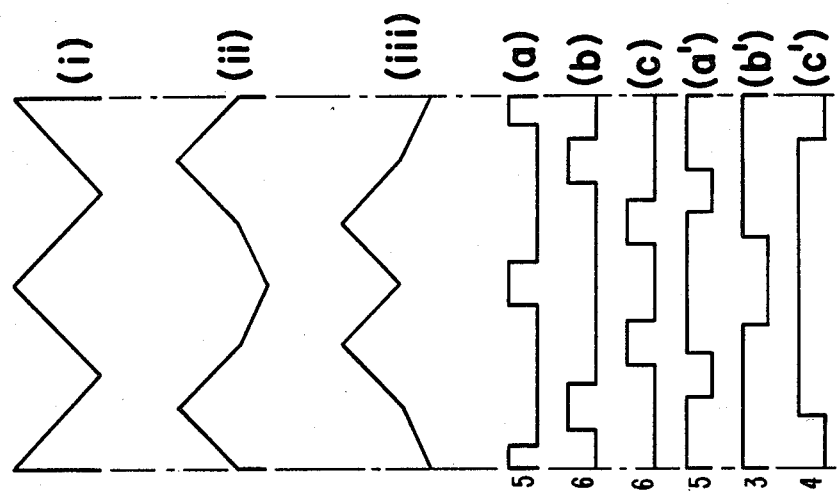

Referring to FIG. 19, curve (a) shows the period of the signal of line 17, also derived by line 24 and applied to sequencer 27. By line 28, sequencer 27 controls inputs $A_A$ and $A_B$ of the ROM function generator, thereby to select the three timing waves I, II, III of FIG. 18 in time succession. The two concurrent signals of lines 28 are shown as (b) and (c) in FIG. 19. The shaded area shows a possible delay in coincidence between the occurrence of an edge on signal $A_A$ (or $A_B$ as well) with respect to the initial edge of the basic period of the $V_{CO}$ output of line 24. Typically, with $f_{IN}=60$ Hz and $f_o=120$ Hz the period of curve (a) of FIG. 19 is $1/[6120(f_{IN}+f_o)]=0.9$ microsecond.

Since the address lines for pins $A_A$, $A_B$ are derived from a counter clocked by an asynchronous 5 MHz signal, the $A_A A_B=\phi\phi$ state may be as short as zero seconds or as long as 0.2 microseconds. Since this time is variable and not definable, the $A_A A_B=\phi\phi$ area in the ROM is not used. However, the $A_A A_B=\phi 1, 1\phi, 11$ addresses will always be of a definable time interval (typically, 0.2 microseconds). The addresses in the ROM have been chosen for this reason. All the control actions of the sequencer can be done within 0.8 microseconds which is less than the worst case, namely the 0.9 microsecond period of the VCO.

The control sequencer 27, also by 4-bit lines 40, triggers latching of $FF_A$ (by line 41), of $FF_B$ (by line 42) and of $FF_B$ (by line 43). The latching signals are shown as (d), (e), (f) on FIG. 19. Lines 40 also pass latching signals to three more flip flops $FF_D$, $FF_E$, $FF_F$, by respective lines 50, 51, 52 to transfer the Q outputs of flip flops $FF_A$, $FF_B$ and $FF_C$ by respective lines 46, 47, 48 to the adjunct flip flop $FF_D$, $FF_E$ or $FF_F$. The latching signal on lines 50, 51, 52 is concurrent and brings the time skewed data from $FF_A$, $FF_B$ and $FF_C$ into time coincidence. The signal of lines 50, 51, 52 is shown at (g) in FIG. 19.

Accordingly, the three signals X, Y, Z are simultaneously passed on lines 56, 57, 58 and distributed by a ROM output encoder 60 (a solid state device sold on the open market as 74188A) in accordance with the sequencer signal of lines 23, 28 and 23 after a division by 6 in divider 44. The divided timing signal (1/6T) is applied by line 45 to the $A_3$, $A_4$, $A_5$ inputs (or three most significant digits) of ROM 60, while the XYZ timing waves are applied to the $A_0$–$A_2$ inputs thereof. Accordingly, drive signals for the GTO devices of the three converters of the UFC are outputted on lines 61, on three respective and corresponding groups of six lines.

At this time, reference should be had to FIGS. 8B, 9A–9C, 14A–14C, 16 and curve sets (c) and (d) of FIG. 18. It is observed that "interlacing" implemented according to the present invention requires (1) to split the prior art "pulse" (or actual time interval) of FIG. 8A of duration $t_1$, as applied to the converters #1, #2, #3 of the UFC, within the period T into fractional pulses disposed apart and symmetrically about the middle of the period T; and (2) that such fractional pulses be distributed each across the half-period evenly between the time converters.

More generally, such "interlacing" proposes to achieve a systematic "non-alignment" of the general configuration of a pulse (or active time interval) preceded or followed by a zero level (or "all co-connected" GTO situation) between any two and even the three converter control lines, thereby to minimize maximum rms value of the input current harmonies.

The various figures show that while two pulses may be disposed of equal duration at equal distances, different from converter to converter, as in FIG. 8B, it is possible also to have a portion of the pulse side by side about the reflecting mirror line at the middle of the period, and the remaining portion of the active period on each side, one at the beginning of the period T, the other at the end of the period T. This is illustrated in FIGS. 14A–14C and in FIG. 16.

It is also observed that, while the active periods are shown not to overlap in the illustrations of FIGS. 8B, 14A–14C, "interlacing" does not exclude overlapping. This is shown in FIG. 18 where, as the increased voltage $V_0$ causes a widening of the active period, a strong overlapping actually occurs, see curves (e), (f) and (g). Nevertheless, "interlacing" is causing such a systematic non-alignment of the active and non-active states that the called-for minimization of the maximum rms value of the input current harmonics is effectively obtained.

Various methods for obtaining the existence functions for interlaced modulation are shown graphically in FIGS. 20–27.

Figure 20:
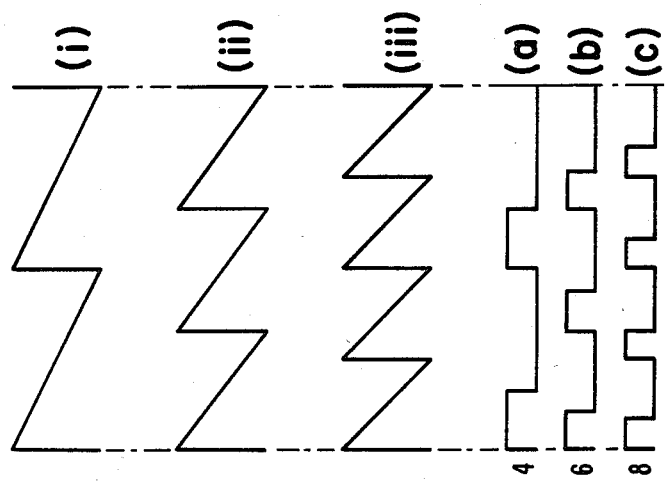
Figure 25:
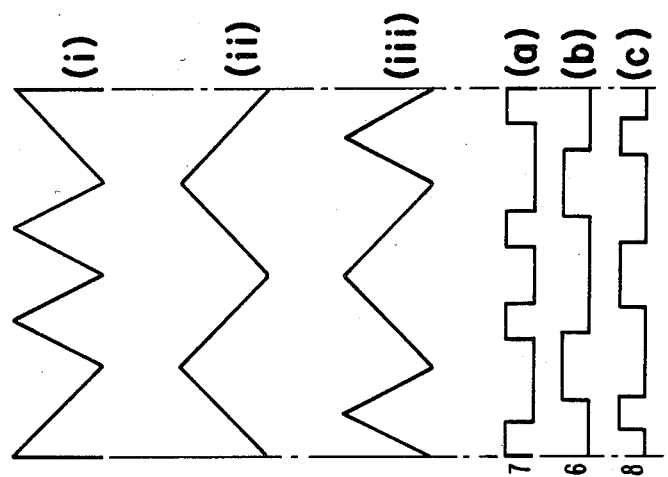
Figure 24:
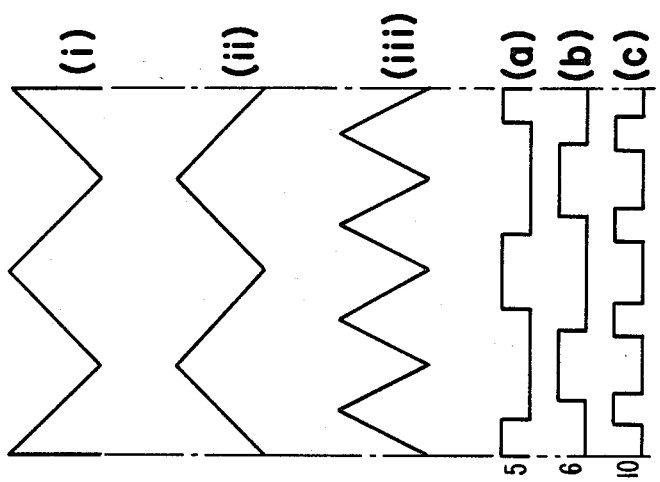
Figure 23:
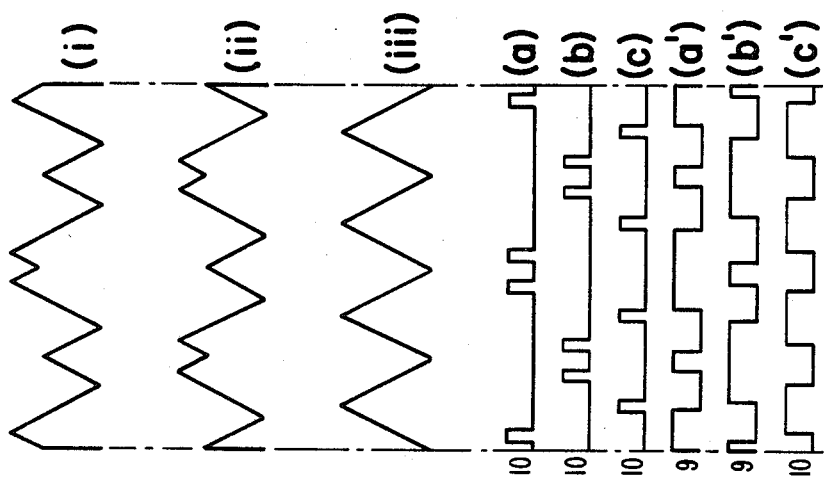
Figure 27:
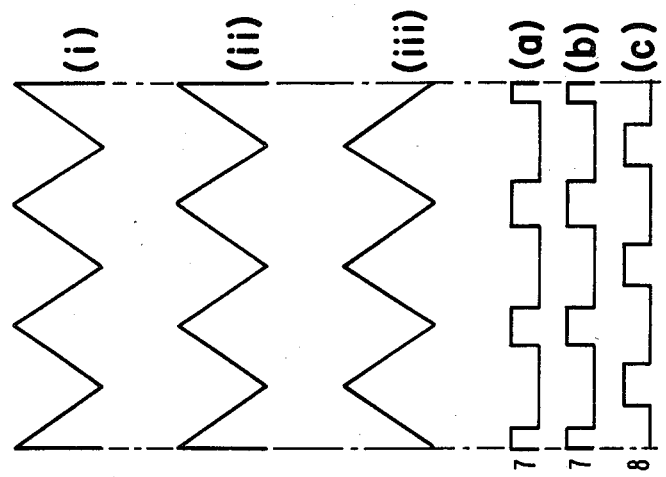
Figure 26:
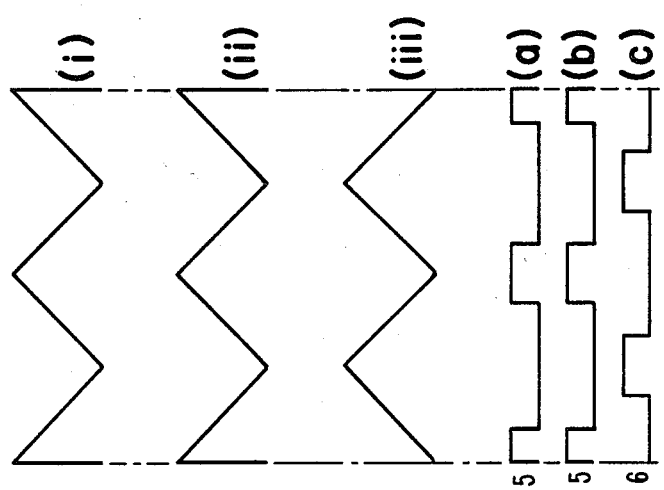

For instance in FIG. 20 under (i), (ii) and (iii) are shown three sets of ramps, or timing waves, leading for a given level $V_0$ to active intervals for three sets (a), (b) and (c) where no interlacing is taking place. By comparison in FIG. 21 the mirror image preparation with the timing waves, or ramps is transposed to interlaced sets (a,b,c) and (a',b',c') for different values of $V_0$. The other FIGS. 22–27 illustrate different solutions to "interlacing".

We claim:

1. In a frequency conversion apparatus having a plurality of phase-related static converters each coupled between a polyphase AC power source of frequency $f_{IN}$ and a polyphase AC output of frequency $f_0$ including:

for each of said converters a plurality of controllable bilateral switching units controlled for conduction in succession during a time period (TP) characterizing said frequency $f_0$, each switching unit having a controllable conduction time interval (t) within a common time frame (T) defined by a controllable repetition rate, and occurring through said succession at said repetition rate to derive energy from said AC power source through the associated converter during successive segments of voltage, on a phase basis, and to apply the derived voltage segments of said succession to said output so as to form with associated like pluralities of converter switching units an AC polyphase output system;

the frequency $f_0$ of said AC output being a function of the difference between the frequency $f_{IN}$ of said AC power source and said repetition rate; the combination of:

means synchronized with said repetition rate and operative on said controllable conduction time interval (t) for establishing with said succession of switching units n elementary conduction time intervals (t*) distributed throughout the time frame (T) of operation of each switching unit in said succession and occurring at a rate which is n time said repetition rate, the sum of said elementary conduction time intervals (t*) within such time frame (T) being equal to said controllable conduction time interval (t), n being an integer in relation to the output frequency of said AC output; and means for controlling the switching units of said succession each one n times before controlling another, thereby to improve the quality of the current in the AC output and in the input AC power source with said n time intervals establishing means comprising:

means for repeatedly generating for each phase converter a timing wave of duration T;

means for applying a reference voltage in relation to said AC output;

means for comparing each of said timing waves with said reference voltage to derive a duration signal of said t duration, said timing waves being such that n comparisons are effected per timing wave within said time frame T, a subsignal of elementary conduction time interval (t*) being derived upon each such comparison; and said timing waves being displaced by the same amount in relation to one another, thereby to effect interlacing between said subsignals from one converter to another.

2. The frequency conversion apparatus of claim 1 with said timing waves having a mirror image about the middle of said time frame interval T.

3. The frequency conversion apparatus of claim 2 with said timing waves having a mirror image between the two ends of said time frame interval T.

4. The frequency conversion apparatus of claim 3 with said generating means including a function generator for storing said time wave.

5. The apparatus of claim 4 with said function generator generating a linear function of time.

* * * * *